(12) United States Patent
Weiss

(10) Patent No.: US 11,010,513 B2
(45) Date of Patent: May 18, 2021

(54) METHODS AND DEVICES FOR PREVENTING COMPUTATIONALLY EXPLOSIVE CALCULATIONS IN A COMPUTER FOR MODEL PARAMETERS DISTRIBUTED ON A HIERARCHY OF GEOMETRIC SIMPLICES

(71) Applicant: National Technology & Engineering Solutions of Sandia, LLC, Albuquerque, NM (US)

(72) Inventor: Chester J. Weiss, Sandia Park, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 563 days.

(21) Appl. No.: 15/871,282

(22) Filed: Jan. 15, 2018

(65) Prior Publication Data
US 2018/0247003 A1    Aug. 30, 2018

Related U.S. Application Data

(60) Provisional application No. 62/464,815, filed on Feb. 28, 2017.

(51) Int. Cl.
*G06F 30/23* (2020.01)
*G01V 99/00* (2009.01)
*G06F 111/10* (2020.01)

(52) U.S. Cl.
CPC ............ *G06F 30/23* (2020.01); *G01V 99/005* (2013.01); *G06F 2111/10* (2020.01)

(58) Field of Classification Search
CPC .......... G06F 30/20; G06F 17/18; G06F 30/23; G06F 2111/10; G01N 33/2823; G01V 99/005

(Continued)

(56) References Cited

U.S. PATENT DOCUMENTS 5,929,860 A * 7/1999 Hoppe ................... G06T 17/20
345/419
5,966,140 A * 10/1999 Popovic ................. G06T 17/20
345/441

(Continued)

FOREIGN PATENT DOCUMENTS

WO     2017016655 A1    2/2017

OTHER PUBLICATIONS

PCT International Search Report and Written Opinion for PCT/US18/13736 (filed Jan. 15, 2018) dated May 11, 2018.

(Continued)

*Primary Examiner* — Thai Q Phan
(74) *Attorney, Agent, or Firm* — Daniel J. Jenkins

(57) ABSTRACT

A computer-implemented method of preventing computationally explosive calculations. The method includes obtaining, by a processor of the computer, measured data of one of a physical process or a physical object; performing hierarchical numerical modeling of a physical process inclusive of an Earth model containing at least one of (a) infrastructure in the ground and (b) a formation feature in the ground, wherein predicted data is generated; comparing the measured data to the predicted data to calculate an estimated error; analyzing the estimated error via an inversion process to update the at least one of the Earth model and infrastructure model so as to reduce the estimated error and to determine a final composite Earth model of at least one of the infrastructure and the feature; and using the final composite Earth model to characterize at least one of the process and the physical object.

23 Claims, 30 Drawing Sheets

(58) Field of Classification Search
USPC .............................. 703/2, 6, 5, 10; 345/441
See application file for complete search history.

(56) References Cited

U.S. PATENT DOCUMENTS

| | | | | |
|---|---|---|---|---|
| 7,010,472 | B1* | 3/2006 | Vasey-Glandon | G06F 30/00 |
| | | | | 703/6 |
| 8,619,242 | B2* | 12/2013 | Suzuki | G21K 1/093 |
| | | | | 356/28 |
| 10,255,670 | B1* | 4/2019 | Wu | H04N 5/2252 |
| 10,664,634 | B2* | 5/2020 | Gentilhomme | G01V 1/282 |
| 2007/0005253 | A1 | 1/2007 | Fornel et al. | |
| 2007/0027666 | A1 | 2/2007 | Frankel | |
| 2009/0070279 | A1* | 3/2009 | Rajabally | G06N 7/005 |
| | | | | 706/12 |
| 2010/0332468 | A1* | 12/2010 | Cantrell | G06F 16/29 |
| | | | | 707/724 |
| 2012/0310613 | A1 | 12/2012 | Moos et al. | |
| 2015/0032426 | A1 | 1/2015 | Chen et al. | |
| 2016/0356125 | A1 | 12/2016 | Bello et al. | |

OTHER PUBLICATIONS

Weiss, "Finite-element analysis for model parameters distributed on a hierarchy of geometric simplices," Geophysics, vol. 82, No. 4, Jul.-Aug. 2017, pp. 155-167.

Weiss, "Hierarchical material properties in finite element modeling: An example in 3D DC resistivity modeling of infrastructure," 6th International Symposium on Three-Dimensional Electromagnetics, Berkeley, California, Mar. 28-30, 2017, pp. 1-10.

* cited by examiner

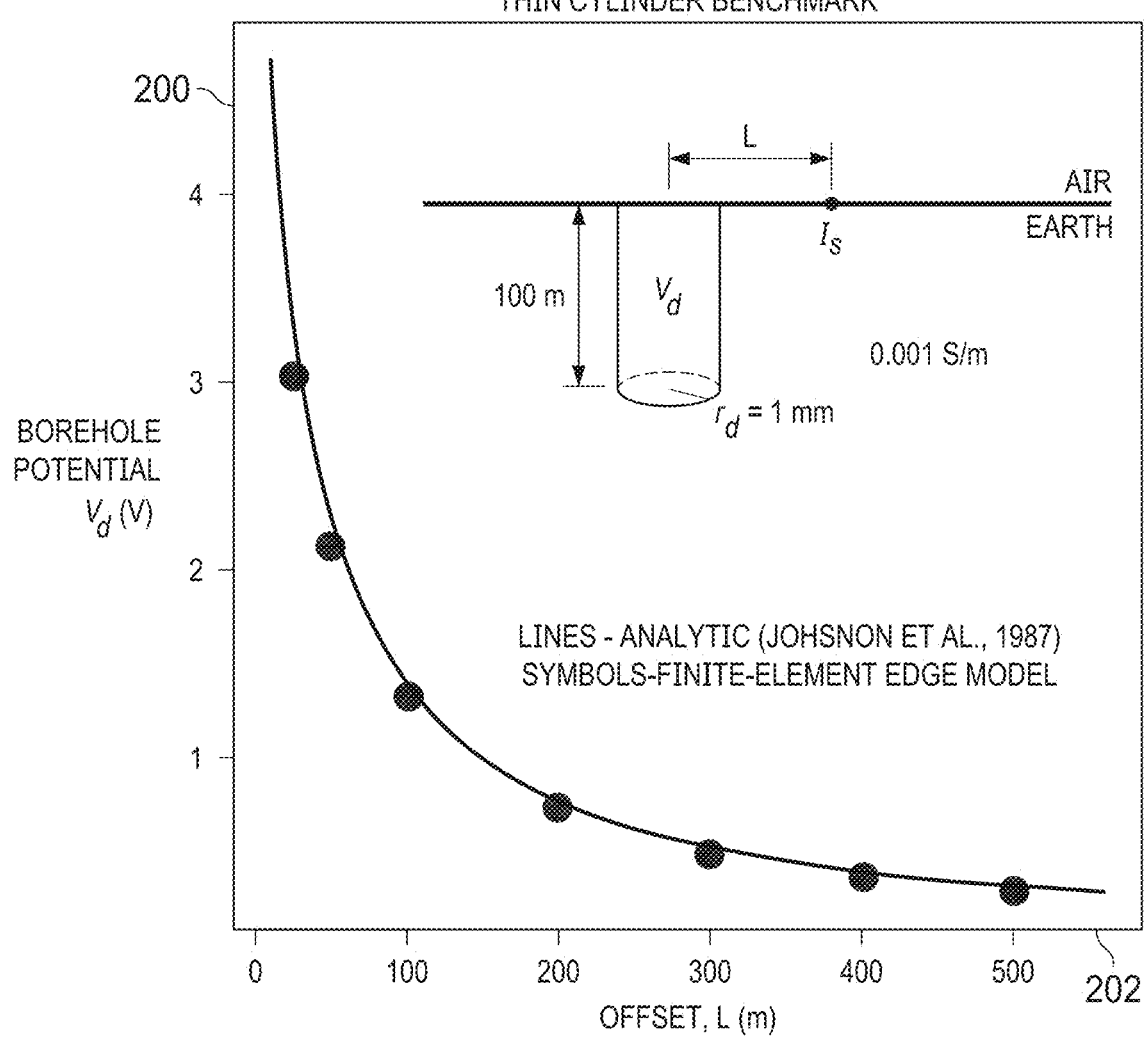

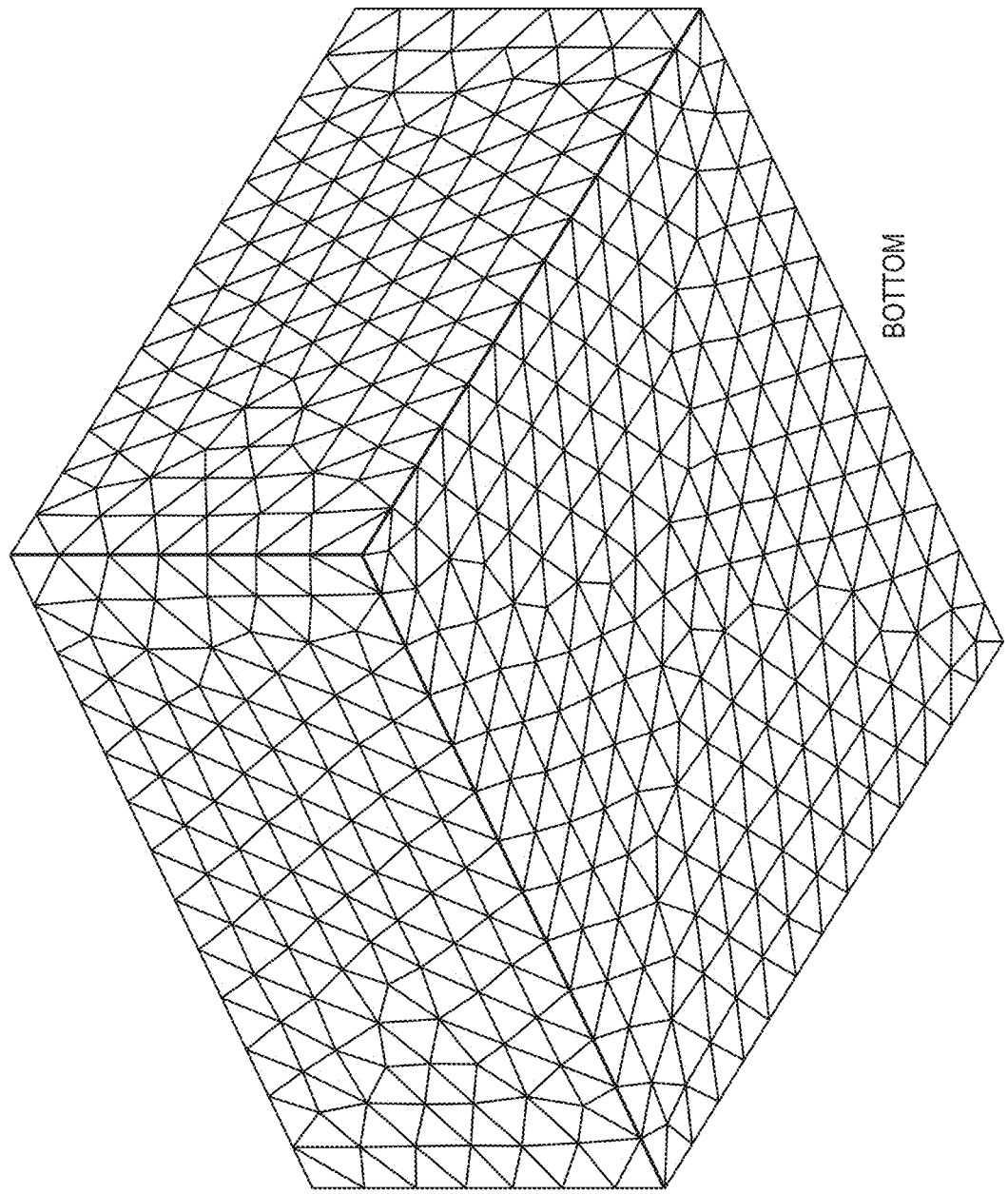

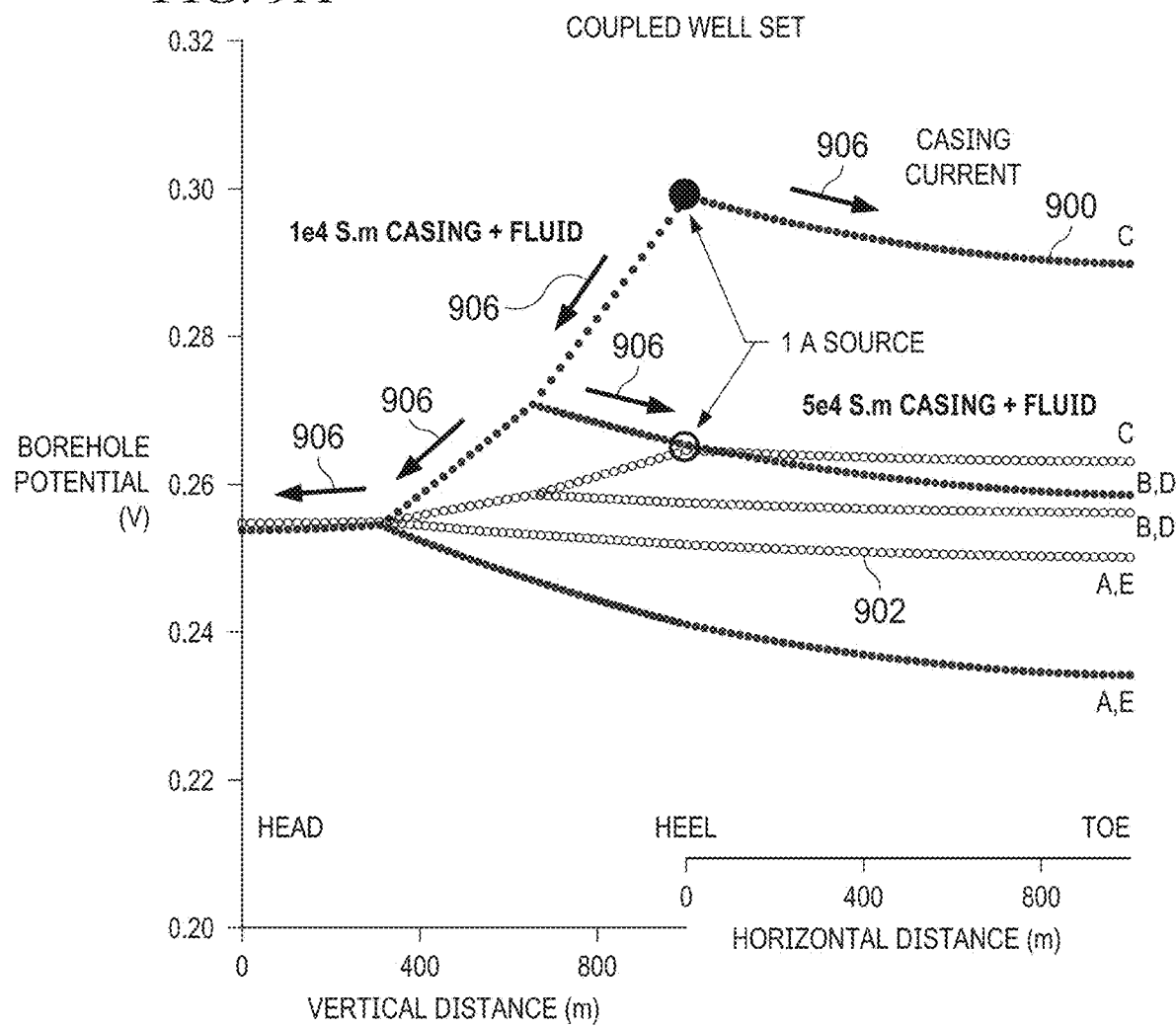

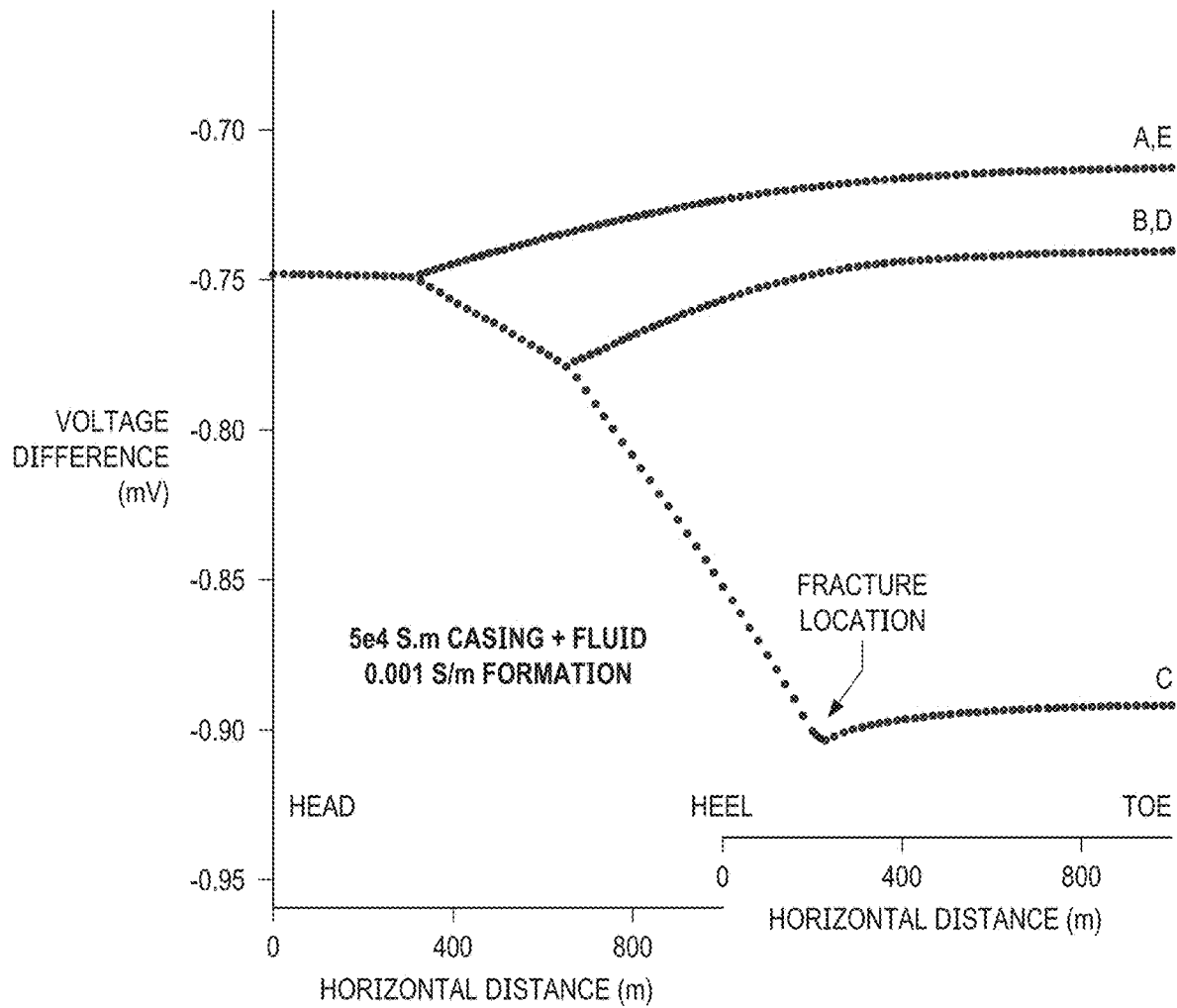

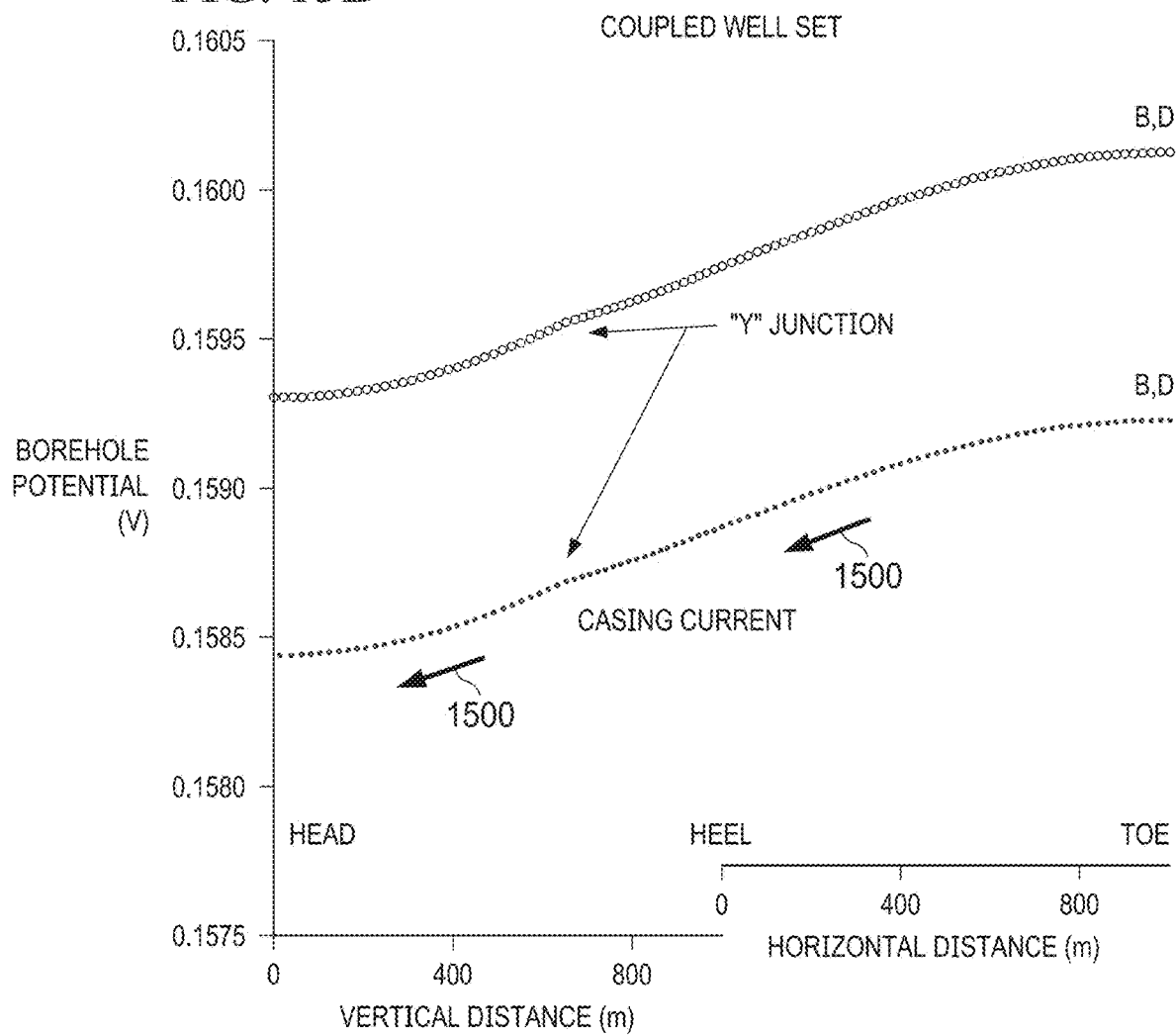

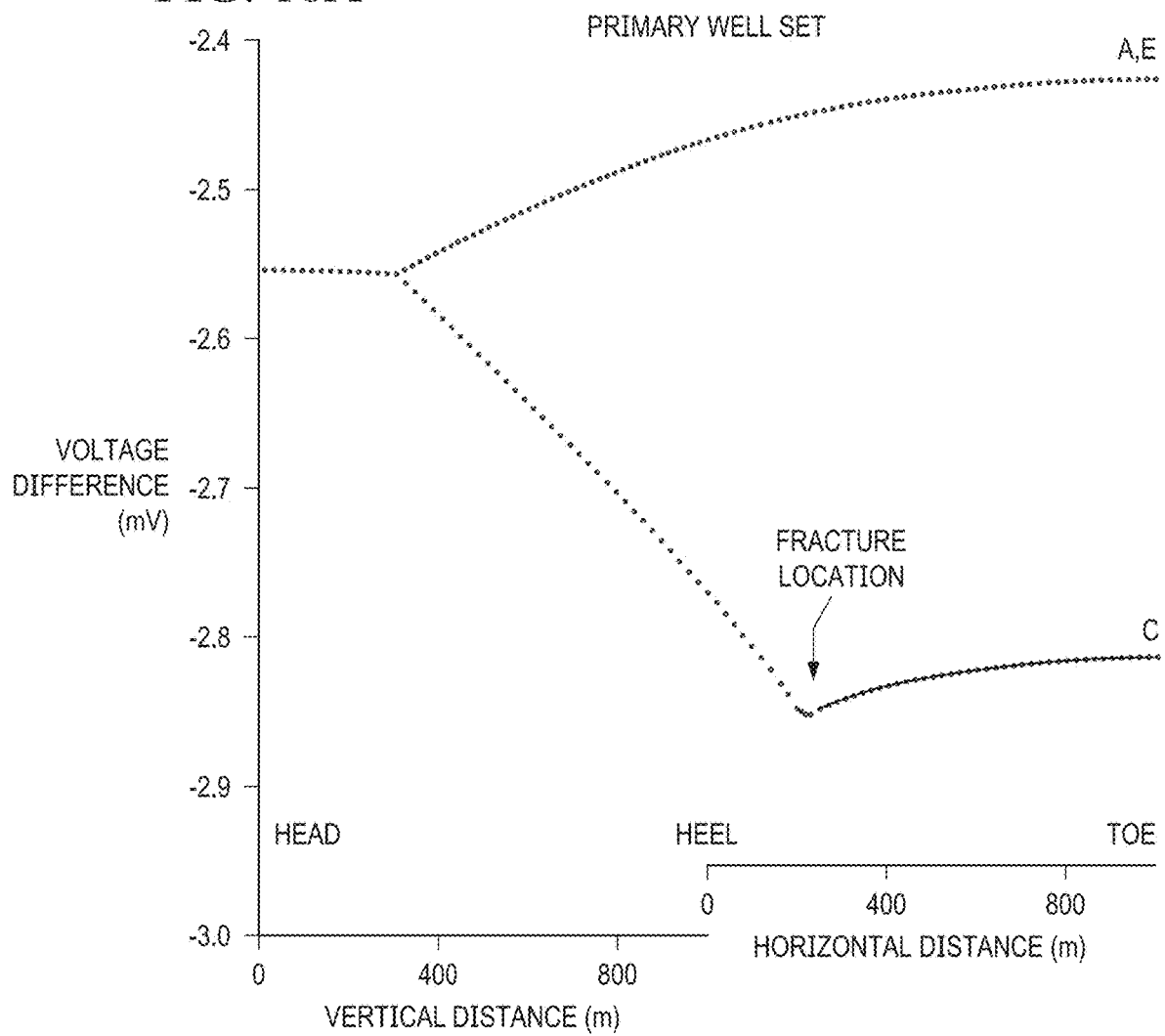

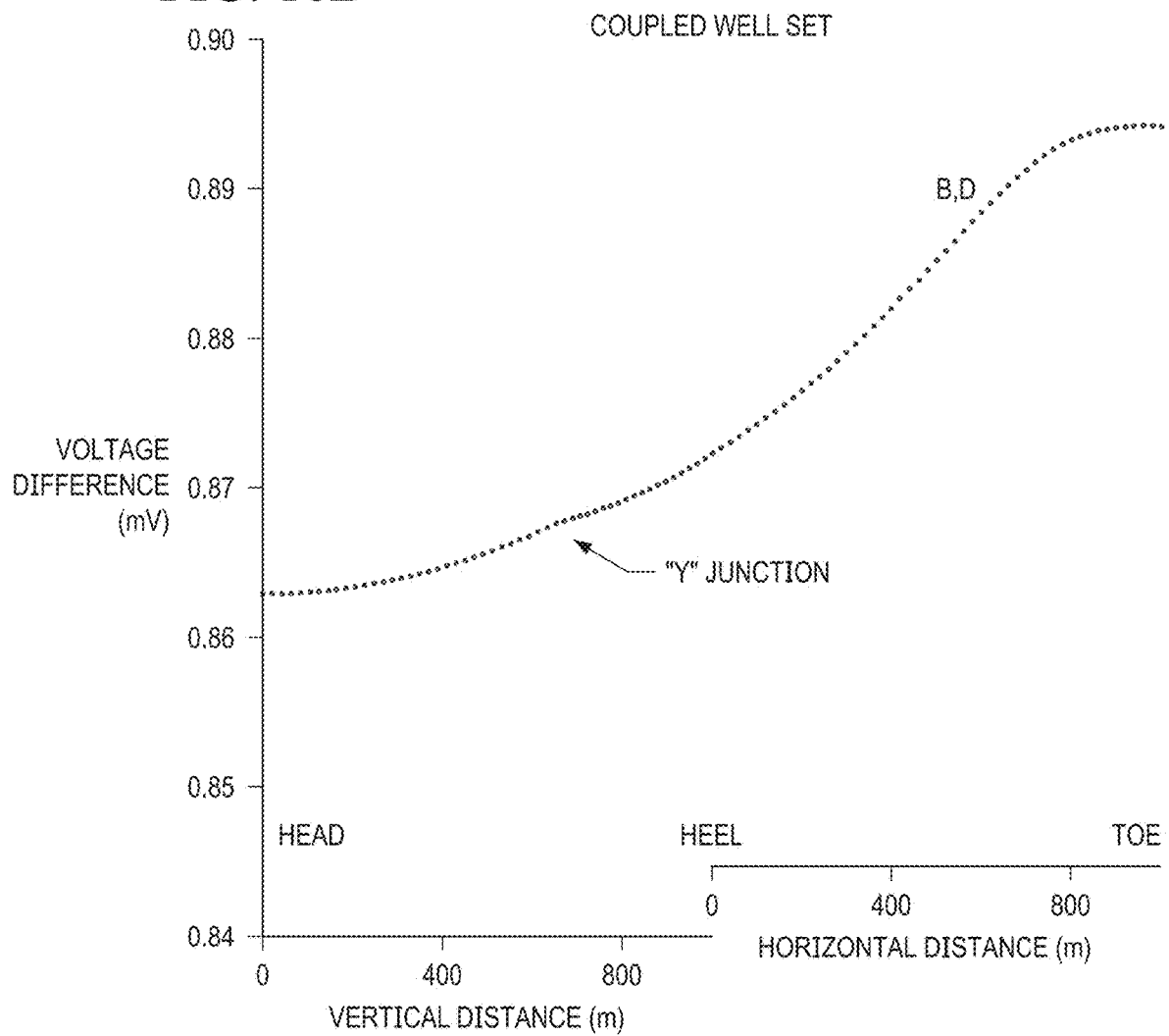

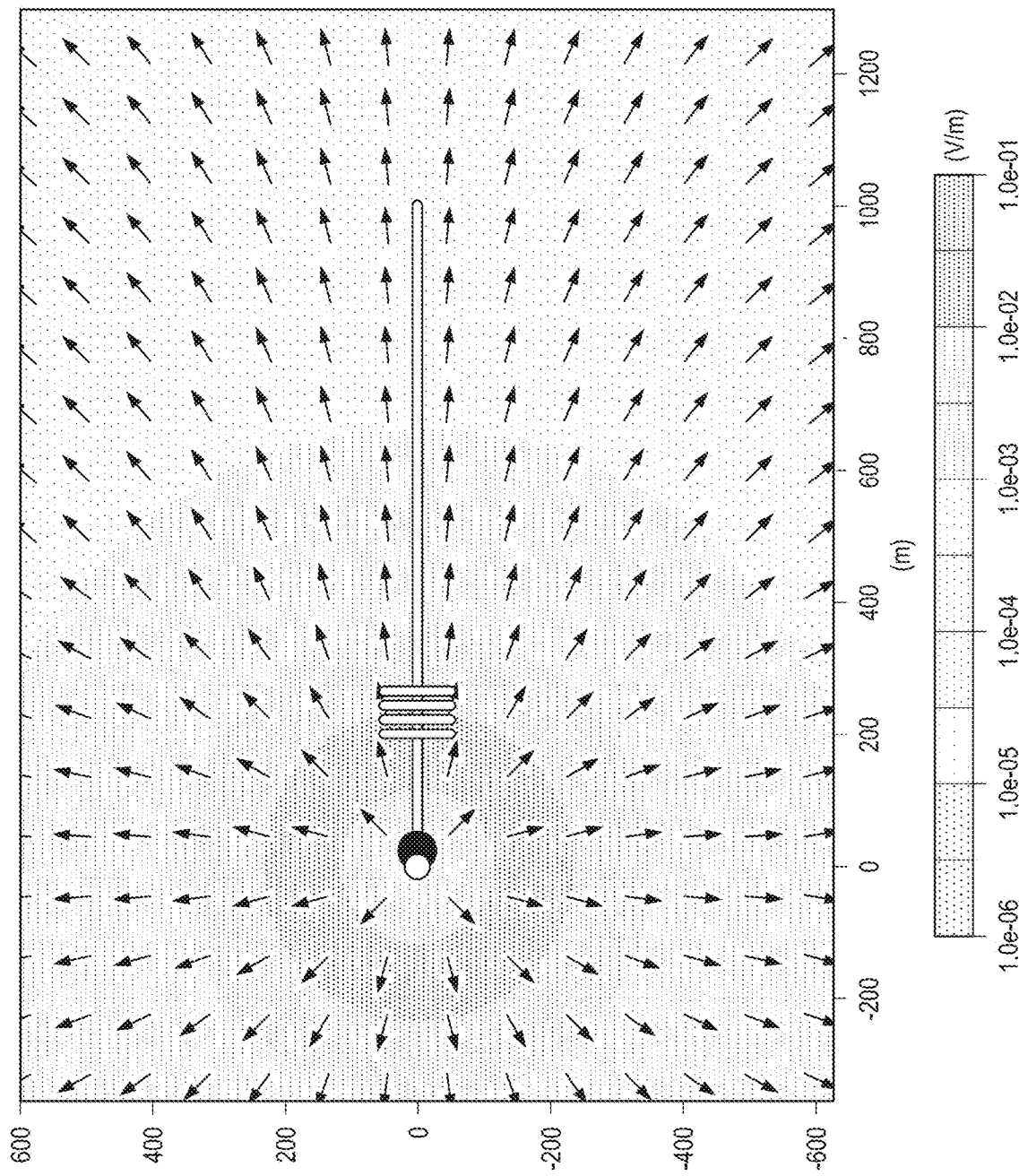

METHODS AND DEVICES FOR PREVENTING COMPUTATIONALLY EXPLOSIVE CALCULATIONS IN A COMPUTER FOR MODEL PARAMETERS DISTRIBUTED ON A HIERARCHY OF GEOMETRIC SIMPLICES

CROSS-REFERENCE TO RELATED APPLICATION(S)

This application claims the benefit of priority to U.S. Provisional Patent Application No. 62/464,815, filed Feb. 28, 2017, and entitled "Methods and Computer Program Products for Locating and Characterizing Clutter in Large Spaces", the entire contents of which are incorporated herein by reference.

GOVERNMENT LICENSE RIGHTS

This invention was made with United States Government support under Contract No. DE-NA0003525 between National Technology & Engineering Solutions of Sandia, LLC and the United States Department of Energy. The United States Government has certain rights in this invention.

FIELD

The present disclosure relates to methods and devices for improving computers by preventing computationally explosive calculations when using numerical techniques to model structures or processes.

BACKGROUND INFORMATION

As a representative example, finite element modeling (FEM) is a mathematical technique used to process data received from one or more sensors to characterize structures or processes in an area being sensed. Finite element method, in particular, is a numerical technique for finding approximate solutions to boundary value problems for partial differential equations. Like other numerical methods, finite element modeling subdivides a large problem into smaller, simpler parts. In this particular example, those parts are called finite elements.

In one of many possible examples, ground penetrating RADAR may be used to sense features or processes in the ground. The data from the ground penetrating RADAR (the sensor) may be processed using finite element modeling. The result of processing is to display an ongoing process being monitored, or to display a representation of a structure present in the ground.

However, a problem arises when modeling features or processes are very thin: that is, small in one or more of their physical dimensions. In particular, when finite element modeling techniques are applied to such features or processes, a very large number of finite elements are used to characterize the sharp edges or thin lines. Thus, when this type of feature or process is to be modeled, the number of calculations required to process the data using finite element modeling becomes computationally explosive.

The term "computationally explosive" means that a sufficient number of computations is required to process data to achieve a desired result and that the computer takes an undesirably long time to complete the processing of the data and achieve the desired result. While the computer is not actually "slower," a human user may perceive the computer as acting slowly as the computer processes all the required calculations. This undesirable amount of processing time can slow down a project and cost significantly more money as time is consumed waiting for the computer.

In some cases, so much computing time is required that a desired action becomes impractical. In a specific example from oilfield geophysics, if a user desired to monitor fracturing of underground structures because of fracking during a drilling operation, then the effect of computationally explosive calculations can result in the computer being unable to monitor the process in real time. In essence, the events of the process are taking place fast enough that the computer cannot keep up with the modeling process, thus making monitoring the process impractical or even impossible.

SUMMARY

The illustrative embodiments provide for a method for a computer-implemented method of preventing computationally explosive calculations arising solely in a computer as a result of the computer modeling a feature or a process in the ground. The computer-implemented method includes obtaining, by a processor of the computer, measured data of one of a physical process or a physical object. The computer-implemented method also includes performing, by the processor, hierarchical numerical modeling of a physical process inclusive of an Earth model containing at least one of (a) infrastructure in the ground and (b) a formation feature in the ground, wherein predicted data is generated. The computer-implemented method also includes comparing, by the processor, the measured data to the predicted data to calculate an estimated error. The computer-implemented method also includes analyzing, by the processor, the estimated error via an inversion process to update the at least one of the Earth model and infrastructure model so as to reduce the estimated error and to determine a final composite Earth model of at least one of the infrastructure and the feature. The computer-implemented method also includes using, by the processor, the final composite Earth model to characterize at least one of the process and the physical object, wherein a characterization is created.

The illustrative embodiments also contemplate a computer including a processor and a computer usable program code storing program code which, when executed by the processor, performs the above computer-implemented method. The illustrative embodiments also contemplate a non-transitory computer recordable storage medium storing program code, which when executed by a processor, performs the above computer-implemented method. Other illustrative embodiments are also possible, as described elsewhere herein.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings.

FIG. 2 illustrates a comparison between finite element solutions (symbols) and analytic (line) solutions for a buried, thin, and near perfectly conducting cylinder, in accordance with an illustrative embodiment.

FIG. 3A, FIG. 3B, FIG. 3C, and FIG. 3D illustrate top and bottom oblique views of a finite element mesh used for a benchmark exercise in FIG. 2, in accordance with an illustrative embodiment.

FIG. 9A and FIG. 9B illustrate a casing voltage for a multilateral well geometry, in accordance with an illustrative embodiment.

FIG. 12A and FIG. 12B illustrate effects of fractures on the casing voltages of well bores for the model shown in FIG. 10 and FIG. 11, in accordance with an illustrative embodiment.

FIG. 15A and FIG. 15B illustrate an effect on the casing voltage for the galvanically coupled well system in FIG. 14, in which fractures are introduced from the heel of a well, in accordance with an illustrative embodiment.

FIG. 16A and FIG. 16B illustrate a difference in the casing voltage due to fractures in the galvanically coupled well system in FIG. 14, in accordance with an illustrative embodiment.

FIG. 17A, FIG. 17B, and FIG. 17C illustrate a plan view of differences in an electric field on the air/Earth interface due to the presence of fractures for three different well systems where the well geometry is the same as in FIG. 9 and FIG. 14, in accordance with an illustrative embodiment.

DETAILED DESCRIPTION

Figure 1A:
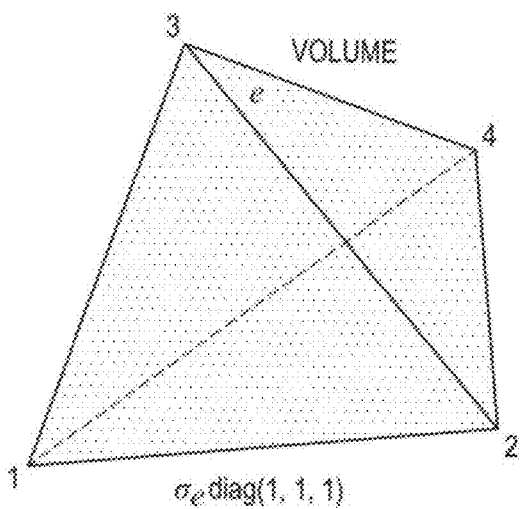
FIG. 1A, FIG. 1B, and FIG. 1C illustrate a hierarchy of volumes, facets, and edges on which the conductivity model equation 3 is defined, in accordance with an illustrative embodiment.

The illustrative embodiments recognize and take into account that, in some cases, so much computing time is required that a desired action becomes impractical. In a specific example, if a user desired to monitor fracturing of underground structures because of fracking during a drilling operation, then the effect of computationally explosive calculations can result in the computer being unable to monitor the process in real time. In essence, the events of the process are taking place fast enough that the computer cannot keep up with the modeling process, thus making monitoring the process impractical or even impossible. Therefore, improvements to computers are needed to avoid or reduce computationally explosive calculations when performing finite element modeling of data taken by sensors.

A resurgence of interest in the problem of electrical or electromagnetic scattering from thin conductors, either on a line or in a plane, has been motivated in recent years by time-lapse fracture monitoring in the near surface, enhanced geothermal reservoirs and unconventional hydrocarbon plays. However, finite element modeling of small electrical features in large computational domains results in a disproportionately large number of elements concentrated in a volumetrically insignificant fraction of the mesh, and it focuses computational resources away from areas of interest elsewhere, such as receiver locations. However, the illustrative embodiments provide for a novel hierarchical conductivity model for unstructured finite element meshes, in which the usual volume-based conductivity on tetrahedra, hexahedra, or Voronoi cells is augmented by facet and edge-based conductivity on the infinitesimally thin regions between elements. Doing so allows a slender borehole casing of arbitrary shape to be coarsely approximated by a set of connected edges on which a conductivity-area product is explicitly defined. Similarly, conductive fractures are approximated by a small number of connected facets that, together, may warp and bend with the mesh topology at no added cost of localized mesh refinement. Benchmarking tests of the direct current (DC) resistivity problem indicate excellent agreement between the facet/edge representations and independent analytic solutions. Consistency tests are also favorable between the facet/edge and volume representations. Building on prior work in DC modeling of a single horizontal well, a multilateral well casing and fracture set is simulated, yielding estimates of borehole casing voltage and surface electric fields measurable with existing sensor technology.

A common requirement in numerical modeling of geophysical experiments, especially in electrical and electromagnetic methods, is to effectively capture a broad range of length scales in a single simulation, from the field scale over which sensors are deployed and regional geologic trends are dominant, to the fine scale in which anthropogenic clutter and geologic details, such as fractures, have the potential to broadcast a disproportionate response. For example, metallic clutter, such as rails, pipes, and borehole casings, although volumetrically insignificant over the field scale, can generate significant and fully coupled, secondary electric and magnetic fields whose magnitude is comparable to, if not larger than, the signal of interest from a geologic target (Fitterman, 1989; Fitterman et al., 1990). The challenge, from a computational perspective, is how best to accurately and economically simulate the response of the large and the small in a given model. Variable mesh resolution in a computational model is nothing new, and there is a mature literature devoted to mesh-refinement schemes in finite element, difference, and volume methods.

However, consider discretization of a steel borehole casing in a computation over a modest field scale—say, a 1×1 km patch of ground and extending 1 km deep into the Earth. At 0.1 m outer radius for the steel casing and 0.025 m wall thickness, a regular tetrahedron with edge length 0.025 m occupies a volume of $$\frac{(0.025 \text{ m})^3}{\left(6\sqrt{2}\right)} = 1.84 \times 10^{-6} \text{m}^3,$$

and therefore 500 m of casing would require $(500 \text{ m})((0.1 \text{ m})^2 - (0.075 \text{ m})^2)\pi/(1.84 \times 10^{-6} \text{ m}^3) = 3.7 \times 10^6$ tetrahedra at the coarsest discretization. More than a 1 km³ simulation volume finely discretized at, say 10 m, approximately $$\frac{3.7}{3.7 + 8.5} \times 100\% = 30\%$$

of the tetrahedra in the mesh will be devoted to $6.9 \times 10^{-7}\%$ of the mesh volume. For longer casings, typical of a production well, these ratios become even more extreme, especially considering larger physical domains for the computation and coarse meshing away from the areas of interest. Furthermore, although (with proper mesh design and problem formulation) the electromagnetic problem can be solved for over domains of this topological size and larger, the computational resources required to do so become significant, typically resulting in specialized algorithms designed for parallel computer architectures (Commer et al., 2015; Um et al., 2015; Haber et al., 2016).

Hence, there has been considerable effort spent on alternative solutions to the problem of computing the electric and electromagnetic fields scattered from thin boreholes subject to excitation by external sources. Nearly all efforts are directed to simplified geometries of straight conductors in a layered or uniform medium, and they rely on either analytic or integral equation methods (e.g., Wait, 1952, 1957; Hohmann, 1971; Parry and Ward, 1971; Howard, 1972; Wait and Williams, 1985; Williams and Wait, 1985; Johnson et al., 1987; Schenkel and Morrison, 1990; Patzer et al., 2017). Qian and Boerner (1995) are a notable exception in that they consider the response of a sinuous conductor in a layered medium through integral equation methods. Extension of any of the works just cited, in an analytic sense, to generalized three-dimensional geometries has not been forthcoming.

In addition to the brute force discretization approach, in which the high cost of borehole meshing is paid in full through fine-scale discretization and parallelization (Commer et al., 2015; Hoversten et al., 2015; Um et al., 2015), or reduced by considering a slightly larger casing (hence, with fewer elements) at the cost of sacrificing true geometric conformity between the borehole/Earth interface (Haber et al., 2016; Weiss et al., 2016), the equivalent resistor network approach has also received some attention (Yang et al., 2016). Based on cross-borehole tomography, in which the borehole casing is exploited as an electrode (Newmark et al., 1999; Daily et al., 2004), Yang et al. (2016) construct a Cartesian grid of conductive blocks and assign electrical conductivity values to the blocks, along with the faces and edges between the blocks.

Thin conductors are economically represented by the face and edge elements of the mesh, and the electric scalar potential at the mesh nodes is computed by solving the linear system of equations resulting from volume averaging of the two Kirchhoff circuit laws. Yang et al. (2016) recognize the similarity between the coefficient matrix of this linear system of equations and the more general $\nabla \cdot \sigma \nabla$ operator describing direct current (DC) excitation of an isotropic conducting medium $\sigma$, and rightfully point out that "regular" DC resistivity modeling (presumably finite element, volume, or difference) is done only with volume-based conductivity cells, and therefore does not accommodate edge-based and face-based conductivity elements.

In the work described herein, the concept of a hierarchical electrical structure—one in which electrical properties of conducting media are associated with volumes, facets, and edges—is developed for the three-dimensional DC resistivity problem, and, in particular, for finite element analysis on unstructured tetrahedral grids. In doing so, the connection is drawn between the (Yang et al., 2016) circuit model and the continuum modeling of fully heterogeneous conductivity distributions, in which edges and facets are free to be arbitrarily oriented and not constrained to a Cartesian grid. To summarize the algorithmic consequences of the proposed hierarchical model, we find that the global stiffness matrix arising from the governing Poisson's equation is modified to also include element-stiffness matrices for two-dimensional facets and one-dimensional edges, thus explicitly keeping the face and edge conductivities "local" to their corresponding nodes rather than being distributed over an entire three-dimensional element.

The remainder of this disclosure is organized as follows: a discussion of the theory behind the hierarchical model; benchmarking and consistency tests to exercise the edge, facet, and volume representations; and a simulated "field" example, in which the DC response is computed for an idealized multilateral well system in the presence of conducting fractures. Attention is also turned to the figures, which should be considered together as a whole.

Theory

For simplicity, consider the Poisson's equation governing the distribution electric scalar potential u throughout a three-dimensional anisotropic medium $\sigma$, subject to a steady electric current density $J_s$:

$$-\nabla \cdot (\sigma \cdot \nabla u) = f \qquad \text{(Equation 1)}$$

where f is given by $\nabla \cdot J_s$ and $\alpha = \text{diag}(\sigma_{11}, \sigma_{22}, \sigma_{33})$ is a piecewise-constant, rank-2 tensor in some local principal axes reference frame defined by orthogonal unit vectors $\hat{e}_1$, $\hat{e}_2$, and $\hat{e}_3$. That is, the local principal axes reference frame is free to vary spatially throughout the medium. In formulating the variational problem based on Equation 1, a "test"

function v is introduced and integrated over the model domain Ω, on whose bounding surface we impose either a homogeneous Dirichlet or Neumann boundary condition. Integration by parts, followed by application of Gauss's theorem and the homogeneous boundary conditions just described results in $$\int_\Omega \nabla v \cdot (\sigma \cdot \nabla u) dx^3 = \int_\Omega v f dx^3 \quad \text{(Equation 2)}.$$

Pause, for a moment, to consider how the integrand on the left side of Equation 2 is affected by variability in the principal conductivities $\sigma_{11}$, $\sigma_{22}$, and $\sigma_{33}$. In the case in which $\sigma = \text{diag}(\sigma, \sigma, \sigma)$, the medium is by definition isotropic and, hence, it is simple to show that $\nabla v \cdot (\sigma \cdot \nabla u) = \sigma \nabla v \cdot \nabla u$. If instead, $\alpha = \text{diag}(0, \sigma, \sigma)$, one finds that $\nabla v \cdot (\sigma \cdot \nabla u) = \sigma \nabla_{23} v \cdot \nabla_{23} u$, where $\nabla_{23}$ is the two-dimensional gradient operator in the $\hat{e}_2$–$\hat{e}_3$ plane of the principal axes' reference frame. Taking this one step further, the case in which $\sigma = \text{diag}(\sigma, 0, 0)$ yields $\nabla v \cdot (\sigma \cdot \nabla u) = \sigma \nabla_1 v \cdot \nabla_1 u$, with $\nabla_1$ being the spatial derivative in the $\hat{e}_1$ direction.

At this point, what has been shown is how the integrand on the left side of Equation 2 collapses to a simpler form under particular symmetries in σ. This showing is a necessary, but insufficient, condition for the problem of defining electrical conductivity over a hierarchy of geometric simplices such as volumes, facets, and edges of a finite element mesh. To complete the development, the details of the electrical conductivity function a are further articulated and defined by the composite function:

$$\sigma(x) = \sum_{e=1}^{N_V} \sigma_e \Psi_e^V(x) + \sum_{e=1}^{N_F} s_e \Psi_e^F(x) + \sum_{e=1}^{N_E} t_e \Psi_e^E(x) \quad \text{(Equation 3)}$$

with hierarchical, rank-2 basis functions:

$$\Psi_e^V(x) = \text{diag}(1, 1, 1) \begin{cases} 1 & \text{if } x \in \text{volume } e \\ 0 & \text{otherwise} \end{cases} \quad \text{(Equation 4)}$$

$$\Psi_e^F(x) = \text{diag}(0, 1, 1)_e \begin{cases} 1 & \text{if } x \in \text{facet } e \\ 0 & \text{otherwise} \end{cases} \text{ and} \quad \text{(Equation 5)}$$

$$\Psi_e^E(x) = \text{diag}(1, 0, 0)_e \begin{cases} 1 & \text{if } x \in \text{edge } e \\ 0 & \text{otherwise} \end{cases} \quad \text{(Equation 6)}$$

For clarity, the number of volumes, facets, and edges is denoted by $N_V$, $N_F$, and $N_E$, respectively. In Equations 5 and 6, the diagonal rank-2 tensor is subscripted by "e" to indicate representation in the local $\hat{e}_1$-$\hat{e}_2$-$\hat{e}_3$ frame (see FIG. 1).

Figure 1B:
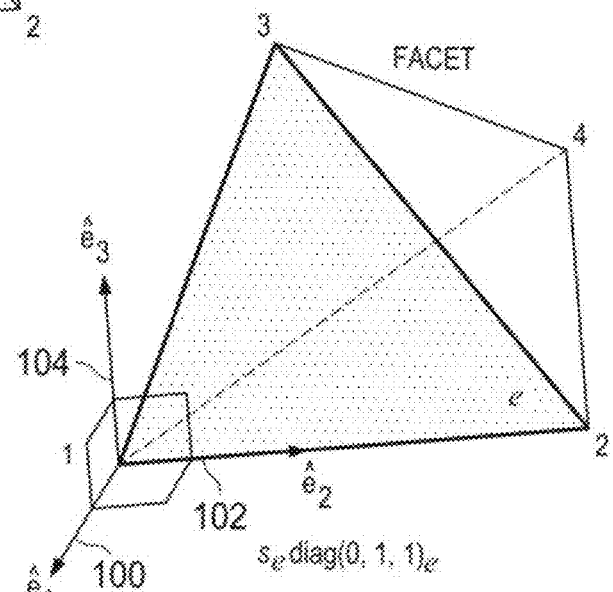
Figure 1C:
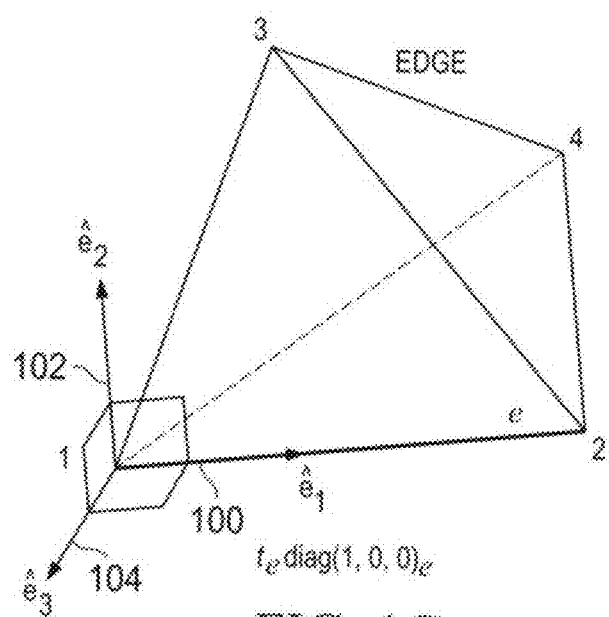

FIG. 1 illustrates a hierarchy of volumes, facets, and edges on which the conductivity model of Equation 3 is defined, in accordance with an illustrative embodiment. FIG. 1A refers to volumes, FIG. 1B refers to facets, and FIG. 1C refers to edges, all on which the conductivity model of Equation 3 is defined. Note that for facets and edges, the $\hat{e}_1$ direction (reference numeral 100) in the local principal axis references frame is oriented normal to the facet and along the edge, respectively.

For facets, the $\hat{e}_2$ 102 and $\hat{e}_3$ 103 directions are taken to lie in the plane of the facet, whereas for the edges, the $\hat{e}_1$ 100 direction is taken to lie parallel to the "e"th edge. Note that volume integration of Equation 3 with the definitions laid out in Equations 4-6 takes on the SI units (S·m²). Hence, the SI units of coefficients $s_e$ and $t_e$ are (S) and (S·m), respectively. That is, $s_e$ represents the conductivity-thickness product of facet e and $t_e$ represents the product of conductivity and cross-sectional area for edge "e".

Continuing from the integral form in Equation 3, completion of the variational problem statement—from which is derived the finite element system of equations—proceeds along the usual way of defining the vector spaces on which v and u reside. This completion has been covered many times before in the literature (e.g., Rücker et al., 2006; Wang et al., 2013; Weiss et al., 2016) and omitted in the present discussion assuming familiarity by the reader. Defining the set of piecewise continuous, linear basis functions $(\{\phi_i(x)\}_{i=1}^N$ over N nodes of the tetrahedral mesh defining our computational domain S $$\phi_i(x) = \begin{cases} 1 & x = x_i \\ 0 & x = x_{j \neq i} \\ \text{pcws linear} & \text{otherwise} \end{cases} \quad \text{(Equation 7)}$$

The finite element solution can be written as $$u = \sum_{i=1}^N u_i \phi_i(x)$$

and test functions $$v = \sum_{i=1}^N v_i \phi_i(x).$$

Substituting these series expansions into Equation 2 and evaluating the volume integrals results in a N×N system of linear equations:

$$Ku = b \quad \text{(Equation 8)}$$

where elements of K are integrals of $\nabla \phi_i \cdot \sigma \cdot \nabla \phi_j$, the vector u contains the coefficients $u_1, u_2, \ldots$, and b is the vector of inner products $(\phi_i, f)$. Observe that the linear system is independent of the coefficients $v_1, v_2, \ldots$, and hence, its solution u is independent of v, as required.

An aspect of the preceding finite element formulation Equation 8 lies in the structure of K as a consequence of the conductivity model in Equation 3, as will soon be made apparent. Focusing on the first of the three summations in Equation 3, taken over the $N_V$ tetrahedra within the domain Ω, the following equation may be written:

$$\int_\Omega \nabla v \cdot \left[ \sum_{e=1}^{N_V} \sigma_e \Psi_e^V(x) \right] \nabla u \, dx^3 = \sum_{e=1}^{N_V} \sigma_e \int_{V_e} \nabla v \cdot \nabla u \, dx^3 \quad \text{(Equation 9)}$$

where $V_e$ is the volume described by the "e"th tetrahedron in the model domain Ω. Substitution of the basis functions of Equation 7 into Equation 9 leads to the well-known three-dimensional "element-stiffness matrices" $K_e^4$, given in local node enumeration (FIG. 1a) as $$\sum_{e=1}^{N_V} \sigma_e \int_{V_e} \nabla v \cdot \nabla u \, dx^3 = \sum_{e=1}^{N_V} \sigma_e v_e^T K_e^4 u_e \quad \text{(Equation 10)}$$

with $K_e^4 = \{\int_{V_e} \nabla\phi_i \cdot \nabla\phi_j dx^3\}_{i,j=1}^4$ and coefficients $v_e = (v_1, \ldots, v_4)_e^T$, $u_e = (u_1, \ldots, u_4)_e^T$. Observe, now, the consequences of defining the "transverse conductance" $s_e$ as done in the second summation in Equation 3 over the $N_F$ facets of the unstructured tetrahedral mesh $$\int_\Omega \nabla_v \cdot \left[\sum_{e=1}^{N_F} s_e \Psi_e^F(x)\right] \nabla u \, dx^3 = \sum_{e=1}^{N_F} s_e \int_{Fe} \nabla_{23} v \cdot \nabla_{23} u \, dx^2 \quad \text{(Equation 11)}$$

where $F_e$ is the area of the "e"th facet and $\nabla_{23}$ is the two-dimensional gradient in the plane of the facet. As a result, the right side of Equation 11 reduces to the two-dimensional element-stiffness matrices $K_e^3$ coupling only those three basis functions on one facet of a given tetrahedron:

$$\sum_{e=1}^{N_F} s_e \int_{Fe} \nabla_{23} v \cdot \nabla_{23} u \, dx^2 = \sum_{e=1}^{N_F} s_e v_e^T K_e^3 u_e \quad \text{(Equation 12)}$$

In keeping with the local enumeration (FIG. 1) of Equation 10, $K_e^3 = \{\int_{F_e} \nabla_{23}\phi_i \cdot \nabla_{23}\phi_j dx^2\}_{i,j=1}^3$, $v_e = (v_1, v_2, v_3)_e^T$, and $u_e = (u_1, u_2, u_3)_e^T$. Evaluation of the third term in Equation 3, containing conductivity-area products $t_e$ defined on mesh edges (FIG. 1) proceeds in a similar way, revealing the underlying presence of the one-dimensional element-stiffness matrices $K_e^2 = \{\int_{E_e} \nabla_1\phi_i \cdot \nabla_1\phi_j dx\}_{i,j=1}^2$. Thus, the composite global matrix K in the finite element system of equations is constructed by a sum of one-dimensional, two-dimensional, and three-dimensional element stiffness matrices $$K = \sum_{e=1}^{N_V} \sigma_e K_e^4 + \sum_{e=1}^{N_F} s_e K_e^3 + \sum_{e=1}^{N_E} t_e K_e^2 \quad \text{(Equation 13)}$$

capturing the electrical properties localized in a hierarchy over volumes, facets, and edges of the finite element mesh.

Observe that the construction in Equation 13 arises from two key steps. First, through use of the rank-2 tensors $s_e$diag $(0,1,1)_e$ and $t_e$diag $(1,0,0)_e$, the coupling between neighboring nodes is restricted to be consistent with facets and edges, respectively. Second, by defining the material property basis functions $\psi_e^F$ and $\psi_e^E$ in Equations 5 and 6 as nonzero only on facets and edges, the effect on u of $s_e$ and $t_e$ variations in the model is weighted by the facet area and edge length, respectively, rather than by the tetrahedral volume. Hence, there is consistency between two meshes that share a common localized s or t distribution, but a difference in how these facets and edges are connected to the rest of the mesh. It is also relevant to point out that although Equation 13 is built using the simple case of linear nodal elements, the same construction applies to nodal elements of higher polynomial order. Details on constructing $K_e^3$ and $K_e^2$ for linear nodal elements are found as described with respect to FIG. 19.

It is interesting to note that although we have only considered the scalar DC resistivity problem, an analogous construction is relevant to 3D finite element solutions of the frequency-domain electromagnetic induction problem in which terms, such as $v \cdot (\sigma \cdot u)$ appear in the "mass" term of the governing second-order equation (e.g., Everett et al., 2001; Mukherjee and Everett, 2011; Schwarzbach et al., 2011; Um et al., 2015). In these cases, it is clear that instead of a summation of element-stiffness matrices Equation 13, the global system of equations would be constructed by a sum of element mass matrices.

IV. BENCHMARKING AND CONSISTENCY TESTING

To test the validity of the conductivity model Equation 3 and its manifestation in the finite element-stiffness matrix Equation 13, finite element solutions are compared against the independent analytic solutions for simplified geometries. Here, the effects of facet- and edge based conductivity are computed by modification—specifically, inclusion of the second and third summations in Equation 13—of the finite element software previously benchmarked in Weiss et al. (2016) for tetrahedral volume-based conductivity. In Weiss et al. (2016), the finite element solution was computed for a thin conducting cylinder oriented vertically in a uniform half-space and excited by a point current source on the boundary of the half-space, some distance laterally from the top of the cylinder, which is coincident with the half space boundary. See FIG. 2.

FIG. 2 illustrates a comparison between finite element solutions (symbols) and analytic (line) solutions for a buried, thin, and near perfectly conducting cylinder, in accordance with an illustrative embodiment. Plotted is the electric scalar potential $V_d$ 200 on the cylinder due to a 1 A point current source located a distance L 202 away from the top end of the conductor. Analytic solutions are given for cylinder radius of 0.001 m, a dimension well within the asymptotic limit for an infinitesimally thin conductor.

This problem geometry admits an analytic solution (Johnson et al., 1987) for perfectly conducting cylinders, which was favorably compared against multiple finite element solutions for a $10^5$ S/m cylinder in a 0.001 S/m half-space.

For the first benchmark test here, the (Johnson et al., 1987) buried cylinder solution is compared against a finite element solution using only edge based conductivities—the last term in Equation 3—for a range of cylinder/source offsets. Analytic solutions were computed in the asymptotic limit of an infinitesimally thin perfect conductor with a radius of 0.001 m, a value taken practically to be several orders of magnitude smaller than the geophysical field scale. Finite element solutions were computed assuming a value $t=10^4$ S·m for those edges coincident with the central axis of the cylinder. Elsewhere, t was set to zero, and hence the summation in the last term of Equation 13 is limited to only those edges representing the cylinder. Assuming a 0.001 m radius, this value of t is equivalent to conductivity value approximately $3.3 \times 10^9$ S/m, a value well in excess of that for metals and even graphene. The volume conductivity was set to 0.001 S/m for all tetrahedra in the domain, including those sharing an edge with a nonzero t value. There is strong agreement between the finite element and analytic solutions (FIG. 2), with errors on the order of a few percent—a number consistent with the previous Weiss et al. (2016) benchmark and, in general, with the total-field finite element results reported in the geophysical literature.

Recall that a principal advantage of using edge-based conductivities is that thin conductors (or, potentially, resistors), such as those described above need not be explicitly discretized in the computational grid. Rather, if their dimensions are small enough with respect to other features of interest, they may instead be represented as a set of infinitesimally thin edges, each connecting two nodes within the grid. Hence, the grid used in the benchmark just described contains no features attempting to replicate the interface between the cylinder and the half-space in which it is embedded. Instead, the "cylinder" is approximated in the finite element mesh by a set of continuous vertical edges (or line) with 1 m uniform node spacing, extending from the air/Earth interface to a depth of 100 m. Note that the spacing between the 1 A surface point source and the cylinder is 1 m for source/cylinder separation less than 100 m, 10 m for separation values 100-250 m, and 30 m for separations beyond that, out to 500 m. See FIG. 3.

Figure 3A:
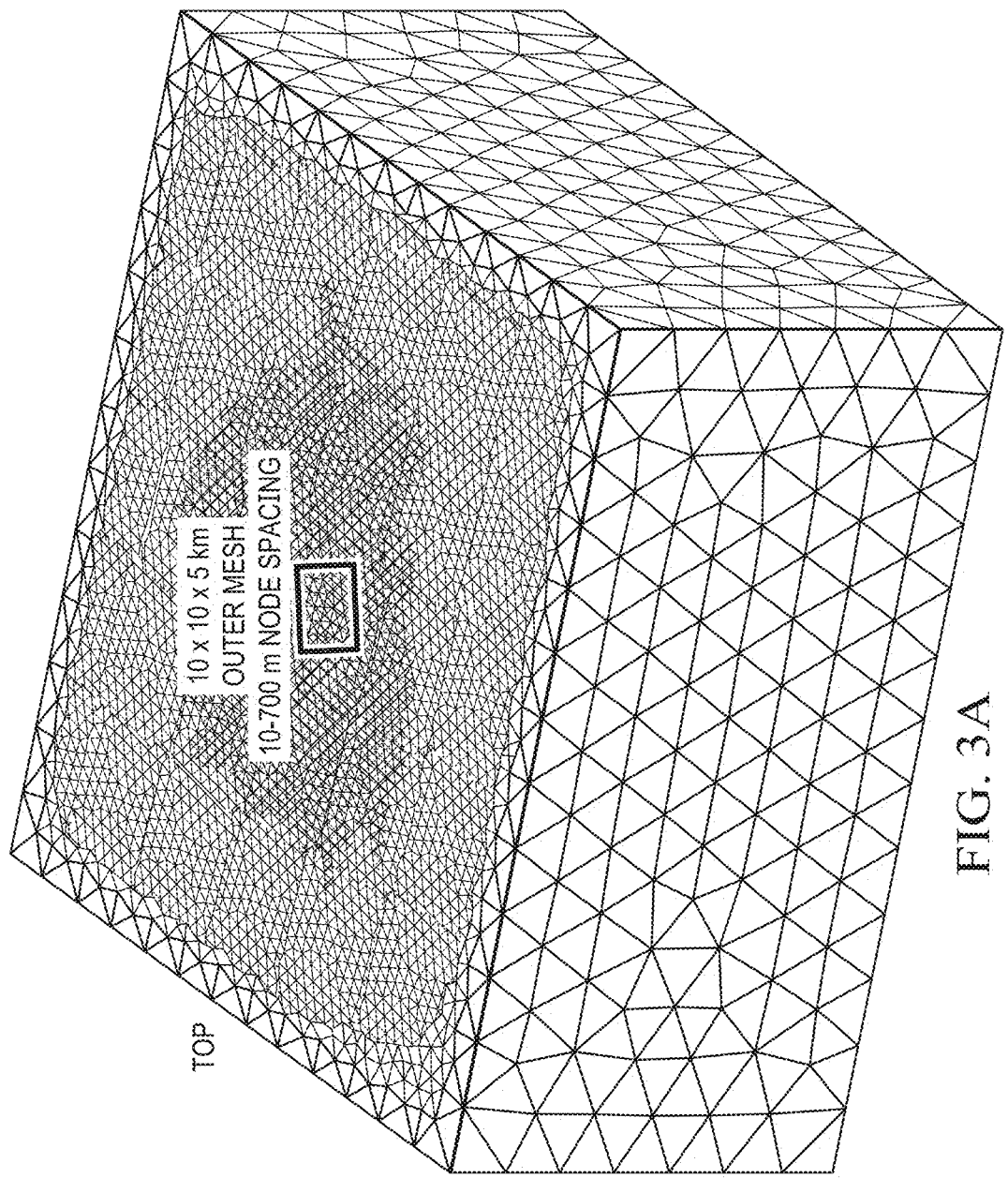
Figure 3C:
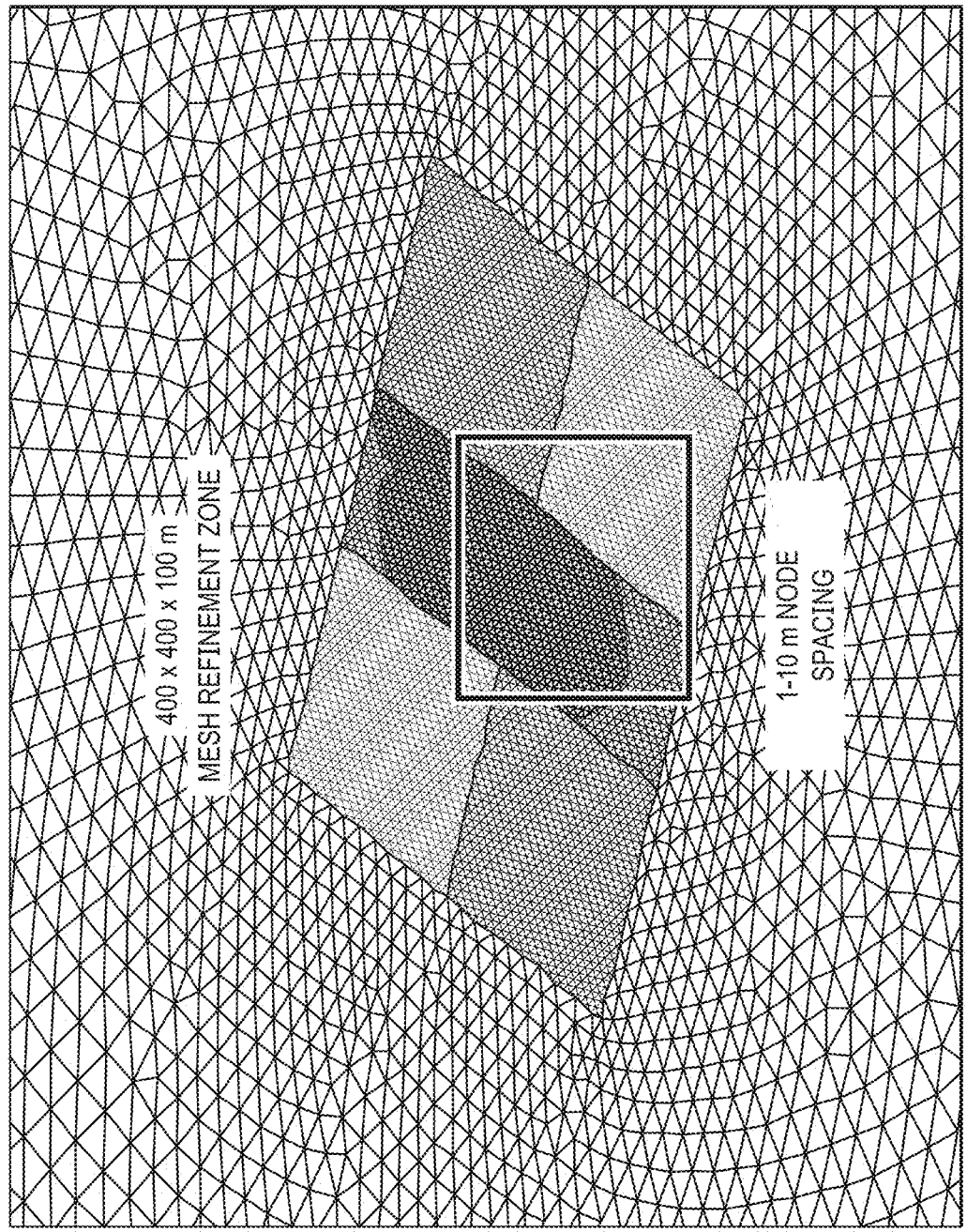
Figure 3D:
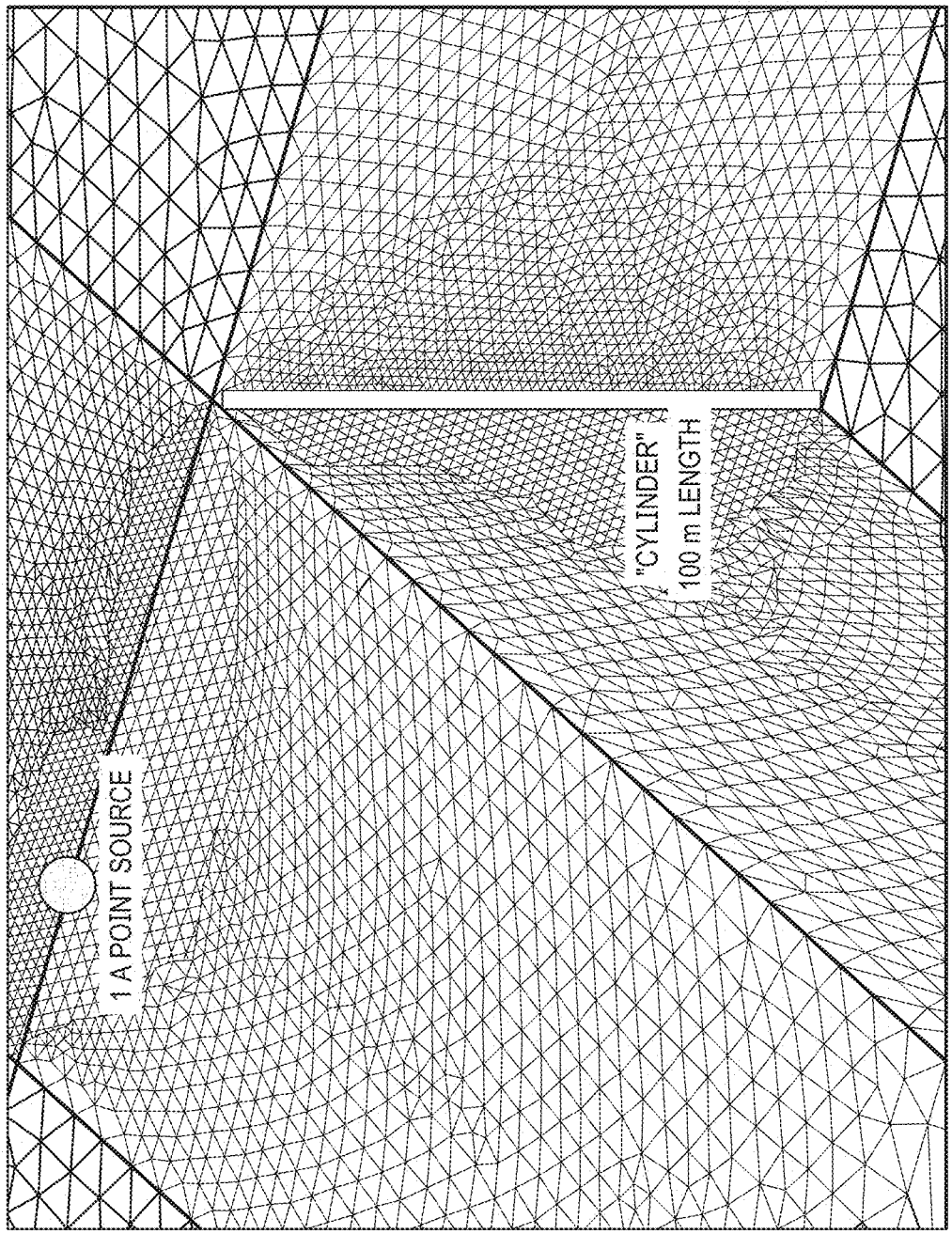

FIG. 3 illustrates top and bottom oblique views of a finite element mesh used for a benchmark exercise in FIG. 2, in accordance with an illustrative embodiment. FIG. 3A shows top and FIG. 3B shows bottom oblique views of the finite element mesh used for the benchmark exercise in FIG. 2. An air region is assumed to lie above the top surface in FIG. 3A, and it is excluded from the computational domain by application of a homogeneous Neumann boundary condition on the air/Earth interface. FIG. 3C is a magnified view of the refinement zone highlighted by the red square in FIG. 3A. FIG. 3D shows a further magnification on the red square in FIG. 3C, with a cutaway showing the set of vertical edges representing the infinitesimally thin vertical cylinder in FIG. 2.

Having demonstrated the agreement between the volume-based conductivity model and analytic solutions (Weiss et al., 2016), and now between the infinitesimally thin edge-based conductivity model and analytic solutions (this study), attention is now turned to the consistency between the facet-based and volume-based conductivity models. In doing so, the logical syllogism of benchmarking the hierarchical model concept in Equation 3 is completed. As an example calculation, take a 1 m thick disk of radius 35 m, lying horizontally at a depth of 10 m and excited by a unit amplitude point source centered above the disk. See FIG. 4.

Figure 4:
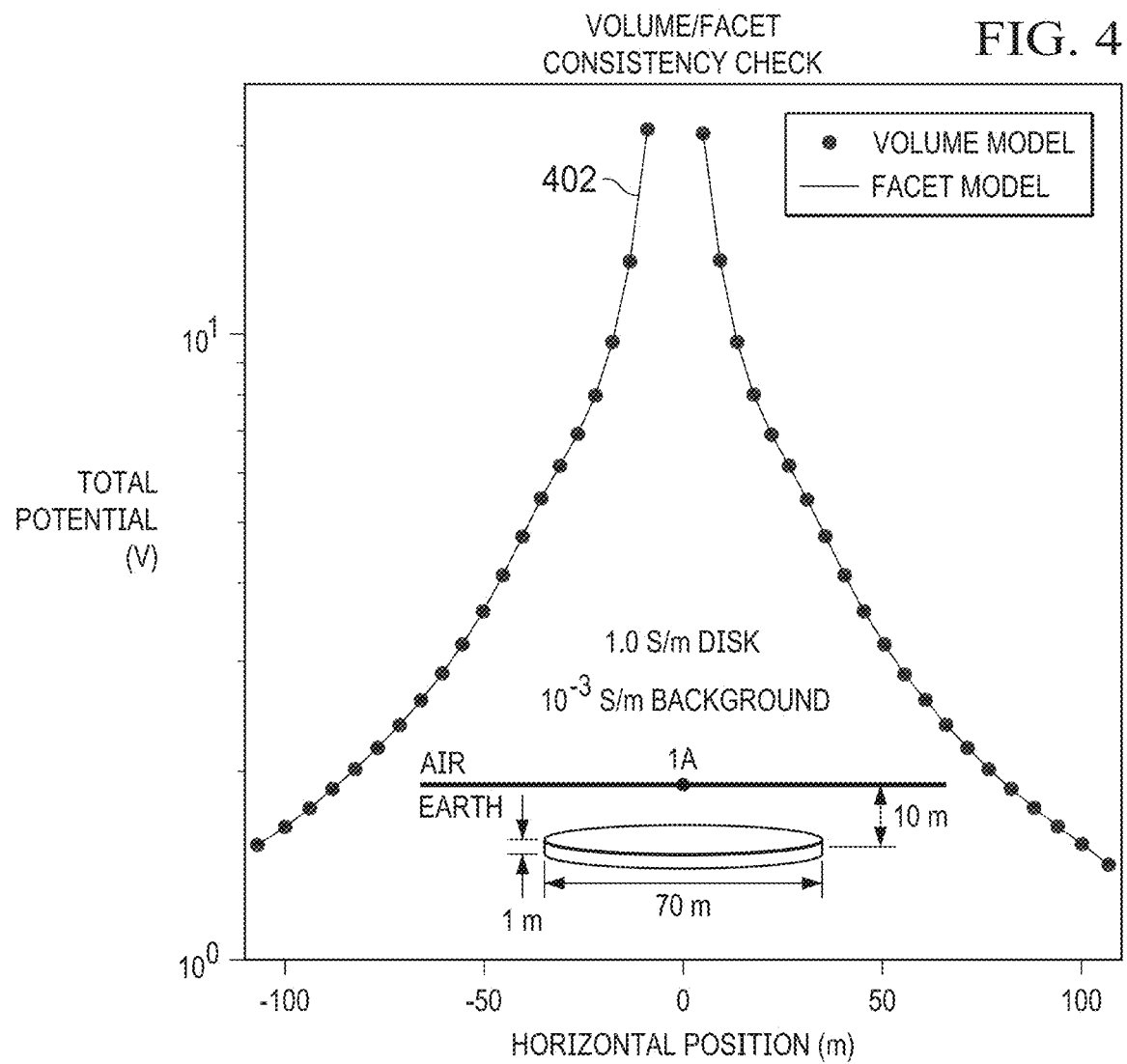
FIG. 4 illustrates a comparison between finite element solutions of a total electric potential for a moderately conductive, horizontal disk buried in a resistive half-space subject to a 1 A point source on the air/Earth interface, in accordance with an illustrative embodiment.

FIG. 4 illustrates a comparison between finite element solutions of a total electric potential for a moderately conductive, horizontal disk buried in a resistive half-space subject to a 1 A point source on the air/Earth interface, in accordance with an illustrative embodiment. Shown by the circles are finite element solutions along the air/Earth interface, centered over the disk, for the case in which the disk is of finite thickness and is described by a conductivity value prescribed to tetrahedra within the disk volume. Shown by line 402 is the solution in which the disk is infinitesimally thin, with the anomalous conductivity being represented by an equivalent vertical conductance assigned to facets on the disk's top side.

Choosing a disk conductivity of 1.0 S/m and a background conductivity of 0.001 S/m, the computed values of the electric potential on the air/Earth interface for a volume-based model, in which the disk is represented by tetrahedra with edge lengths approximately 1.4 m and conductivity 1 S/m, are in strong agreement with computed values, in which the disk is represented by facets at a depth of 10 m with conductance s=1 S/m×1 m=1 S (FIG. 4). That is, for each model, there is the same number of nodes (N=200,902) and tetrahedra ($N_V$=1,177,757), of which 28,747 were constrained to the volume of the thin disk. In the facet model, this subset of tetrahedra was assigned the background conductivity value and, instead, the $N_F$=8624 triangles on the top side of the disk were assigned s=1. Note that $N_F \ll N_V$ for the facet model, and therefore the added cost of computing the second summation in Equation 13 is minimal, especially when considering that there are 16 elements in each element matrix $K_e^4$ versus only nine in $K_e^3$. Further calculations in which the disk conductivity varied between 0.01 and 10 S/m show similar agreement for the smaller, and more sensitive, scattered potentials. See FIG. 5.

Figure 5:
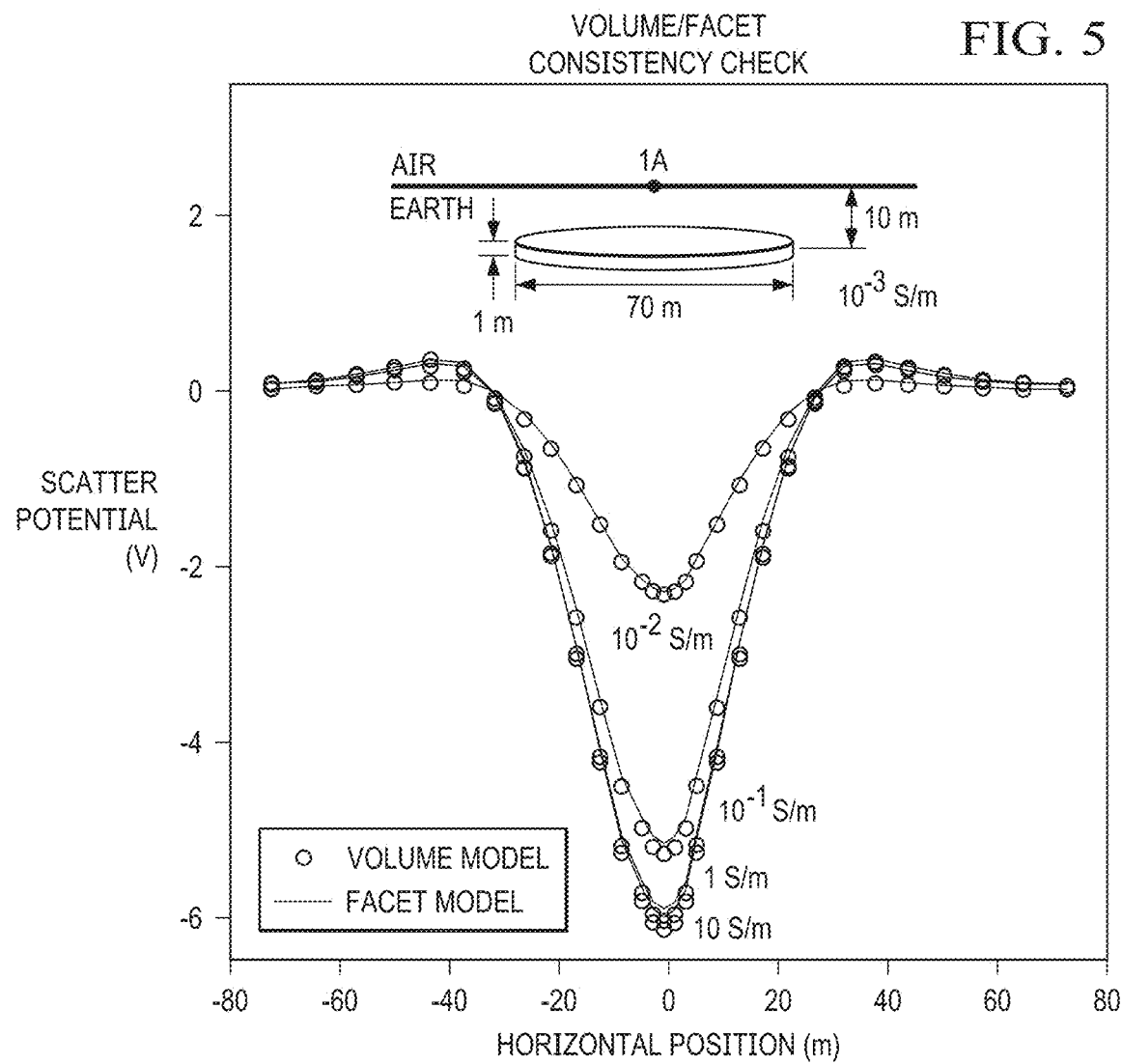
FIG. 5 illustrates a comparison of finite element solutions of a scattered electric potential for a series of conductive thin disks embedded in a half-space, subject to a 1 A point source on the air/Earth interface directly over the disk center, in accordance with an illustrative embodiment.

FIG. 5 illustrates a comparison of finite element solutions of a scattered electric potential for a series of conductive thin disks embedded in a half-space, subject to a 1 A point source on the air/Earth interface directly over the disk center, in accordance with an illustrative embodiment. Specifically, FIG. 5 shows a comparison of finite element solutions of the scattered electric potential for a series of (0.01, 0.1, 1.0, and 10 S/m) conductive thin disks embedded in a 0.001 S/m half-space, subject to a 1 A point source on the air/Earth interface directly over the disk center.

Examination of the cross section of electric field in a vertical plane through the center of the disk gives some indication of why the facet model is an appropriate representation for conductive features. Because the disk is conductive, one finds that the magnitude of the vertical gradient in the potential in the disk is far less than the magnitude in the horizontal direction. See FIG. 6.

Figure 6:
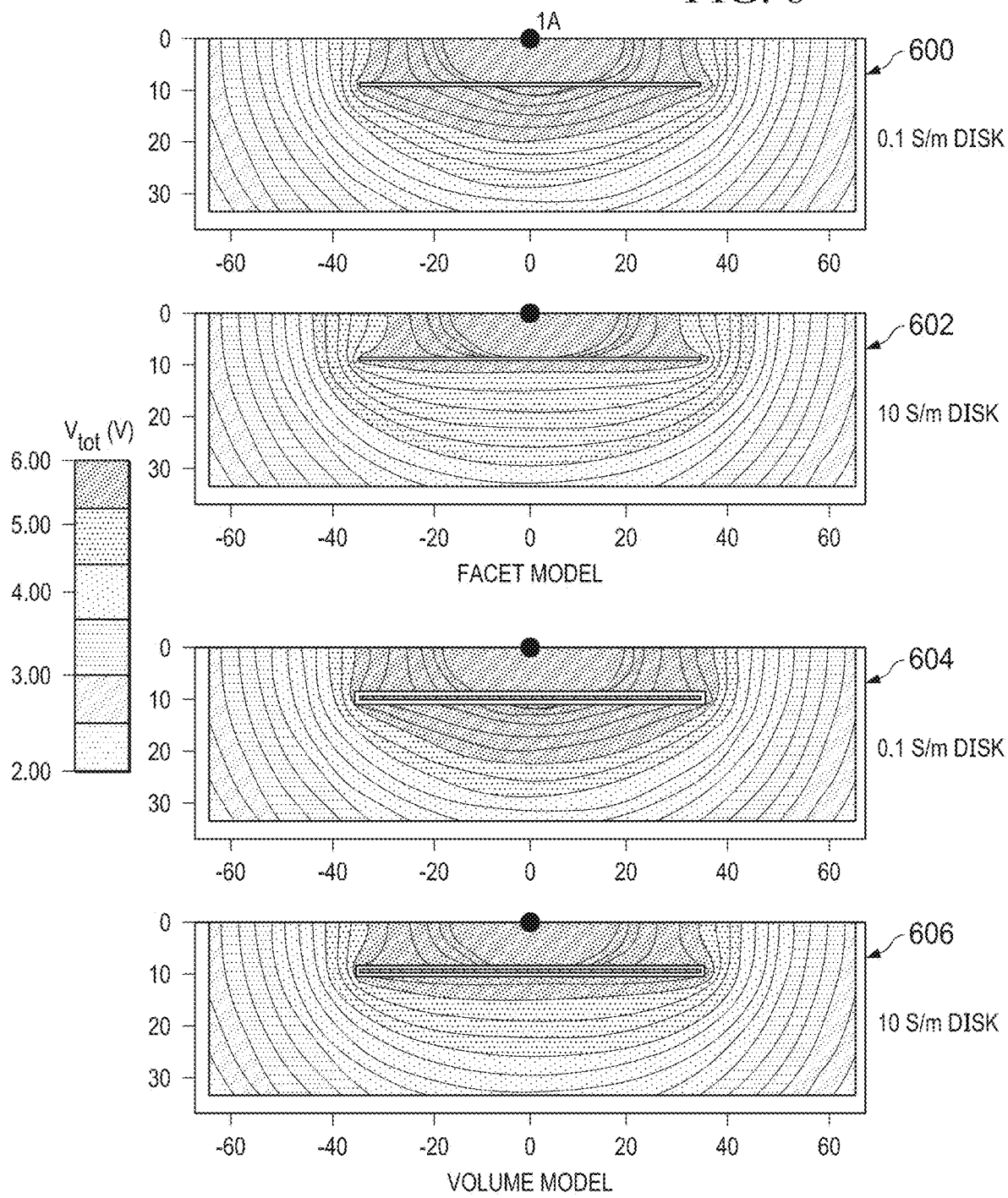
FIG. 6 illustrates a vertical cross section of the electric potential through the center of the disk in FIG. 5, in accordance with an illustrative embodiment.

FIG. 6 illustrates a vertical cross section of the electric potential through the center of the disk in FIG. 5, in accordance with an illustrative embodiment. Specifically, FIG. 6 shows vertical cross sections of the electric potential through the center of the disk in FIG. 5. Graph 600 is a facet model of a 0.1 S/m disk. Graph 604 is a volume model of a 0.1 S/m disk. Graph 602 is a facet model of a 10 S/m disk. Graph 606 is a volume model of a 10 S/m disk.

Hence, in the limit of a very thin, but finitely conducting disk, the potential is reasonably approximated by a continuous, two-dimensional function along the disk face. In the limit of an infinitely conducting disk, this function is, of course, a constant. In contrast, when the disk is resistive, the potential is discontinuous in the vertical direction in the limit of an infinitesimally thin disk. See FIG. 7.

Figure 7:
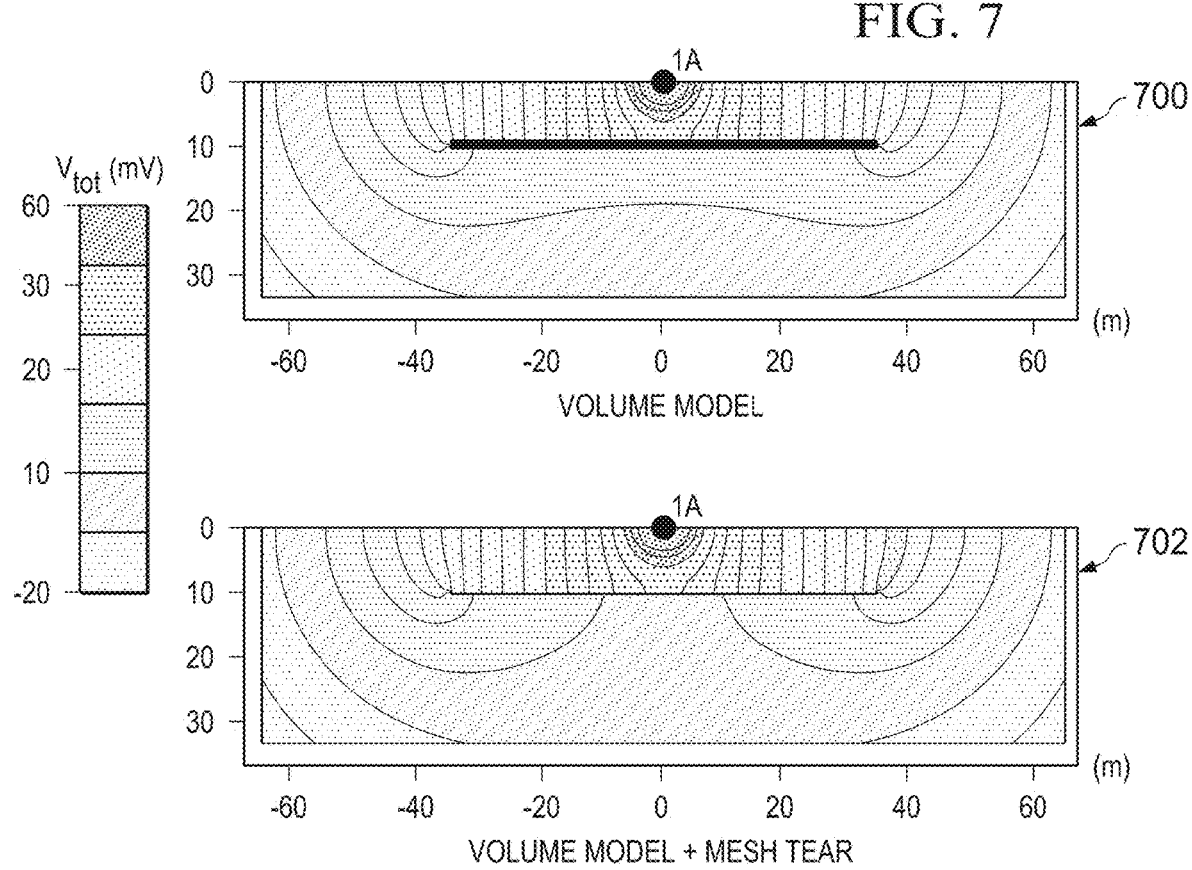
FIG. 7 illustrates a vertical cross section of the electric potential through the center of a resistive disk shown in FIG. 5, in accordance with an illustrative embodiment.

FIG. 7 illustrates a vertical cross section of the electric potential through the center of a resistive disk shown in FIG. 5, in accordance with an illustrative embodiment. In particular, FIG. 7 is a vertical cross section of the electric potential through the center of a resistive disk in a 1.0 S/m background, with geometry the same as shown in FIG. 5. For graph 700, the resistive disk is represented using a volume model, with disk conductivity of 0.001 S/m and thickness of 1.0 m. For graph 702, the finite-thickness disk is replaced with a circular tear in the finite element mesh coincident with the top surface of the disk, on which is imposed a homogeneous Neumann boundary condition, thus implying an infinitesimally thin and resistive disk.

The conductivity model Equation 3 is not invalidated in such a case; rather, the finite element basis itself must be modified to admit tears (discontinuities) in the solution. The mesh is modified such that a surface across which a discontinuity is to be enforced is twice discretized, with one set of nodes for facets corresponding to elements on one side of the surface, and another set of nodes for facets of elements on the opposite side. See FIG. 8. Imposing a homogeneous Neumann boundary condition on the tear implies that the resistor is infinitesimally thin and infinitely resistive.

Figure 8:
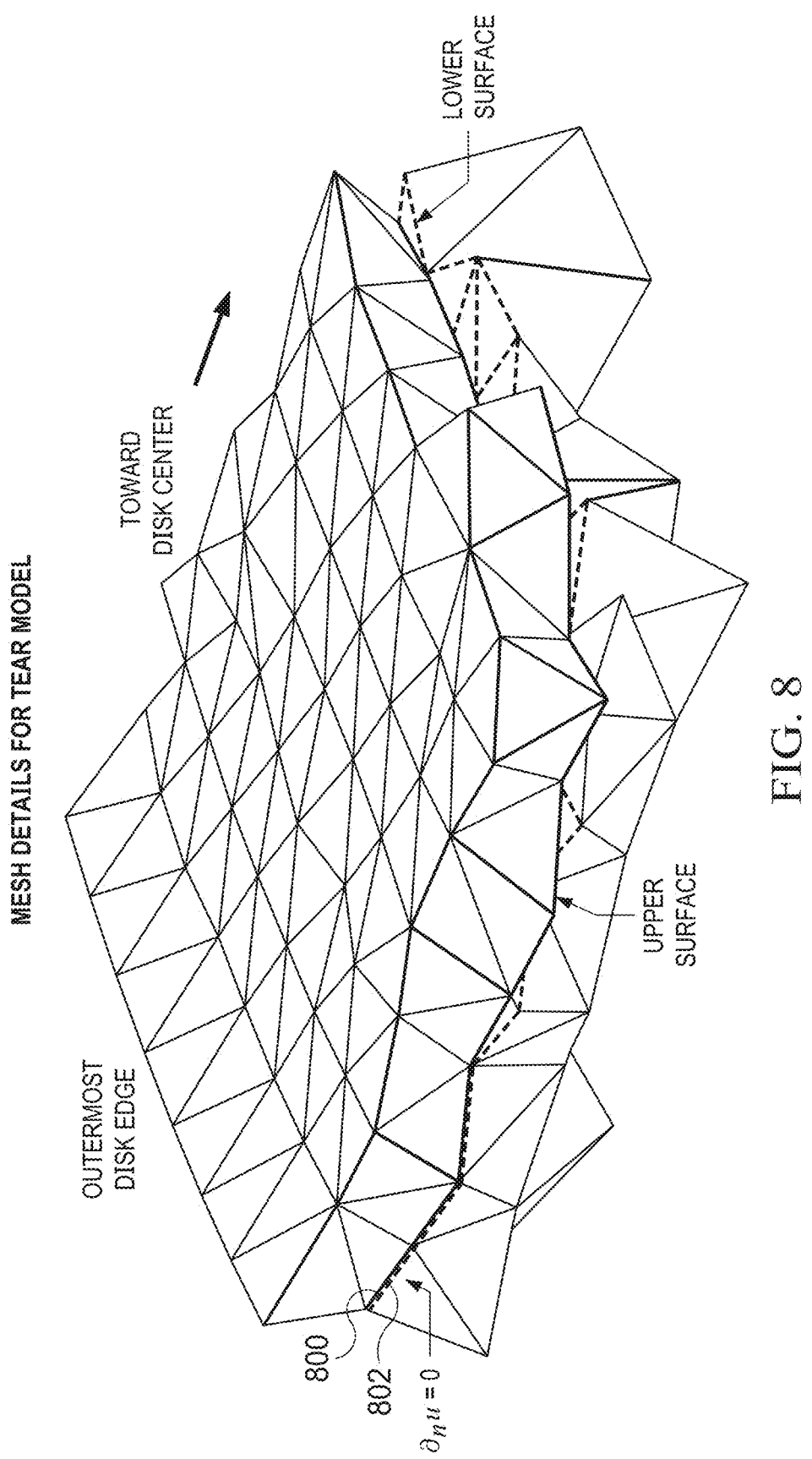
FIG. 8 illustrates a close up of a finite element mesh used for calculation of an electric potential in FIG. 7, in which a tear in the mesh, along with a homogeneous Neumann boundary condition, is imposed to represent an infinitesimally thin and infinitely resistive circular disk, in accordance with an illustrative embodiment.

FIG. 8 illustrates a close up of a finite element mesh used for calculation of an electric potential in FIG. 7, in which a tear in the mesh, along with a homogeneous Neumann boundary condition, is imposed to represent an infinitesimally thin and infinitely resistive circular disk, in accordance with an illustrative embodiment. Mesh edges corresponding to upper, solid line 800 and lower, dashed line 802, which correspond to surfaces of the zero-thickness disk show that nodes on either side of the tear do not require a one-to-one spatial correspondence. Rather, each side may be discretized independently except on the perimeter, where they match. For scale, the element edges are approximately 1 m in length in this figure.

V. MULTILATERAL WELL SIMULATION

To demonstrate the flexibility of the proposed model representation (Equation 3), a set of numerical experiments has been devised that simulates the DC response of a multilateral well configuration, in which the geology is described by conductivity a on tetrahedral elements, the borehole is described by conductivity-area products t on tetrahedral edges, and fractures are described by conductance s on tetrahedral facets. Thus, only the path of the borehole needs to be discretized, rather than the actual borehole diameter and wall thickness. Similarly, only the fracture planes need discretization, and not some thin, but finite, slab populated by many small elements: a common, but computationally cumbersome approach (see Commer et al., 2015; Um et al., 2015; Haber et al., 2016; Weiss et al., 2016).

Figure 9B:
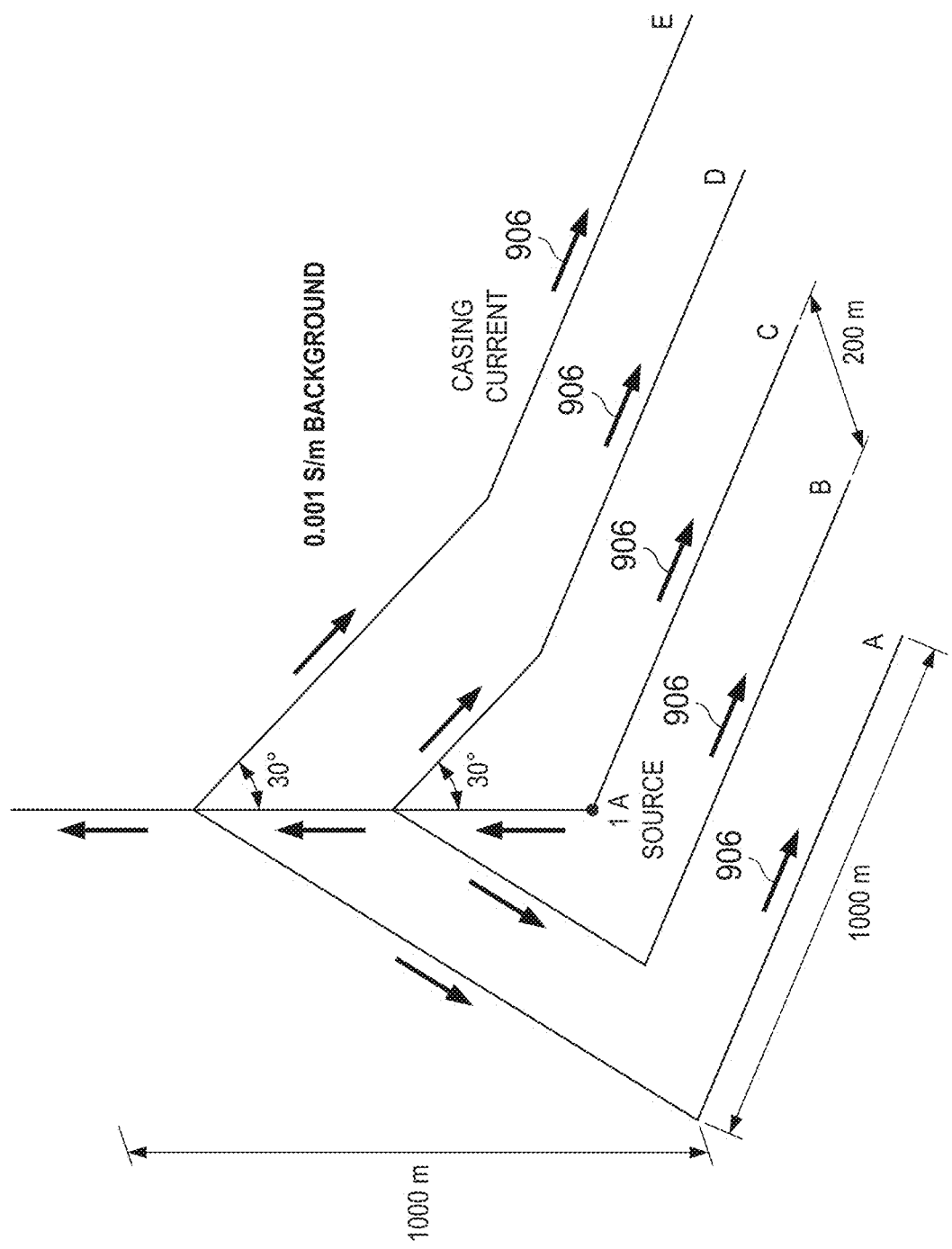

FIG. 9A and FIG. 9B illustrate casing voltage for a multilateral well geometry, in accordance with an illustrative embodiment. FIG. 9A shows casing voltage for multilateral well geometry. FIG. 9B shows casing voltage for multilateral well geometry in a 0.001 S/m formation.

Assuming a 0.2 m diameter borehole casing with 0.025 m wall thickness, the effect of casing conductivities $7.3 \times 10^5$ and $3.6 \times 10^6$ S/m is shown by dotted curves 900 and circle curves 902, respectively. Averaged over the cross-sectional area of the borehole, the fluid conductivity has a negligible contribution to the total conductivity of the total conductivity area product of the combined fluid-borehole system. Also shown by arrows 906 is the direction of the casing current given by the gradient of the casing potential.

For the simulation results that follow, a multilateral well configuration is considered, consisting of a vertical borehole from which a set of five horizontal wells extending 1000 m in length is located at 1000 m depth (FIG. 9B). With lateral separation of 200 m, these wells cover an area approximately 1 km$^2$. To minimize the effects of a complicated geology (e.g., Weiss et al., 2016), layering and heterogeneity are neglected and, instead, the wells reside in a uniform 0.001 S/m half-space. Following the example in Weiss et al. (2016), the well system is energized by a 1 A source located in the heel of the central well. The well casing is discretized by a set of connected tetrahedral edges, geometrically conformal to the well bore path and with 20 m node spacing, equivalent to approximately two sections of standard well casing.

Recognizing that the casing conductivity affects the DC electrical response, end-member values $1 \times 10^5$ and $5 \times 10^5$ S·m of the conductivity-area product t in Equation 3 are considered. Assuming a 0.1 m radius well and with 0.025 m wall thickness, these t values correspond to casing conductivities of $7.3 \times 10^5$ and $3.6 \times 10^6$ S/m, respectively. Although the well fluid inside the casing does constitute approximately 56% of the cross-sectional area of the fluid-casing system under this geometry, its conductivity is so small (even with a generous upper bound for hypersaline brines at 10 S/m) that it contributes little to the overall t value. Under these assumptions, it is found that the voltage drop along the horizontal well casings of a multilateral system have magnitudes on the order of 10 mV for a resistive casing and 1 mV for a conductive casing. See FIG. 9A. Inspection of the voltage gradients shows the direction taken by the casing current (not the leakage current) along the multilateral circuit, demonstrating agreement with Kirchhoff's current law, even though it is not explicitly imposed on the system. When considering the big picture of casing voltages and those distributed throughout the surrounding geology, one finds that the variation along the casing is small in comparison, and that the multilateral system energizes the formation between the wells to a voltage between 200 and 300 mV, outside of which there is a rapid decay to a few tens of mV. See FIG. 10.

Figure 10:
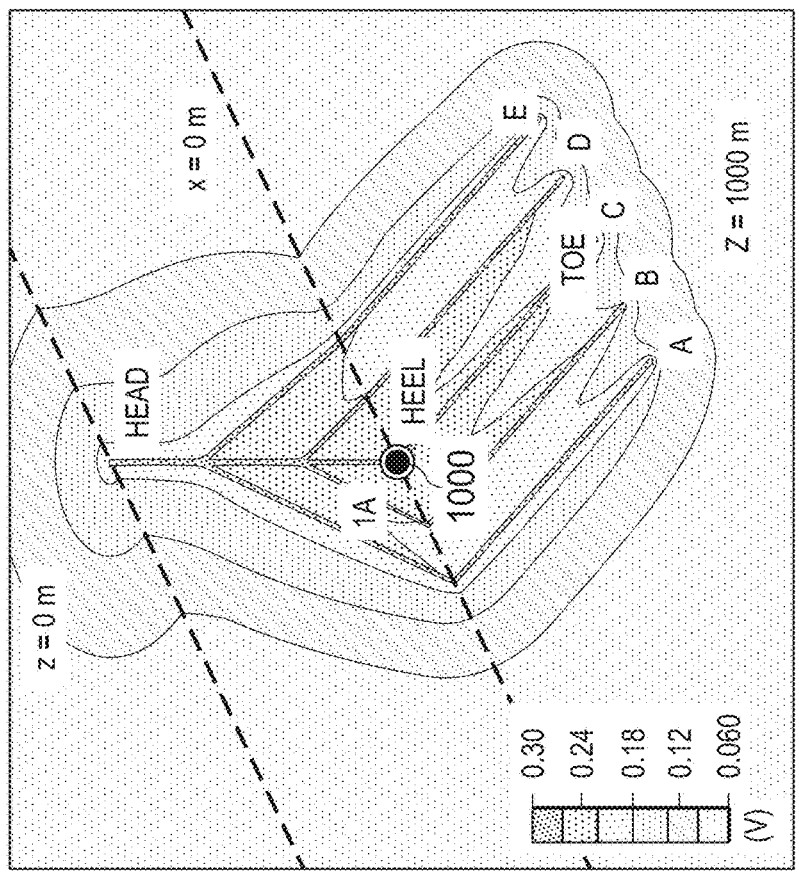
FIG. 10 illustrates an example calculation of a multilateral casing excitation in which the well casing is represented by an infinitesimally thin, edge-based conductivity model, in accordance with an illustrative embodiment.

FIG. 10 illustrates an example calculation of a multilateral casing excitation in which the well casing is represented by an infinitesimally thin, edge-based conductivity model, in accordance with an illustrative embodiment. In particular, FIG. 10 is an example calculation of a multilateral casing excitation (cutaway view, units V), in which the well casing is represented by an infinitesimally thin, edge-based conductivity model (middle term, Equation 3). The point 1 A source is located at heel 1000 of the center well, C. Wells are 1000 m deep and extend 1000 m horizontally with a lateral separation of 200 m. The formation conductivity is 0.001 S/m; the well casing plus fluid is represented by a line distribution of $t=5\times10^4$S m (0.1 m radius casing, 0.025 m wall thickness, and conductivity $3.6\times10^6$S/m).

Figure 11A:
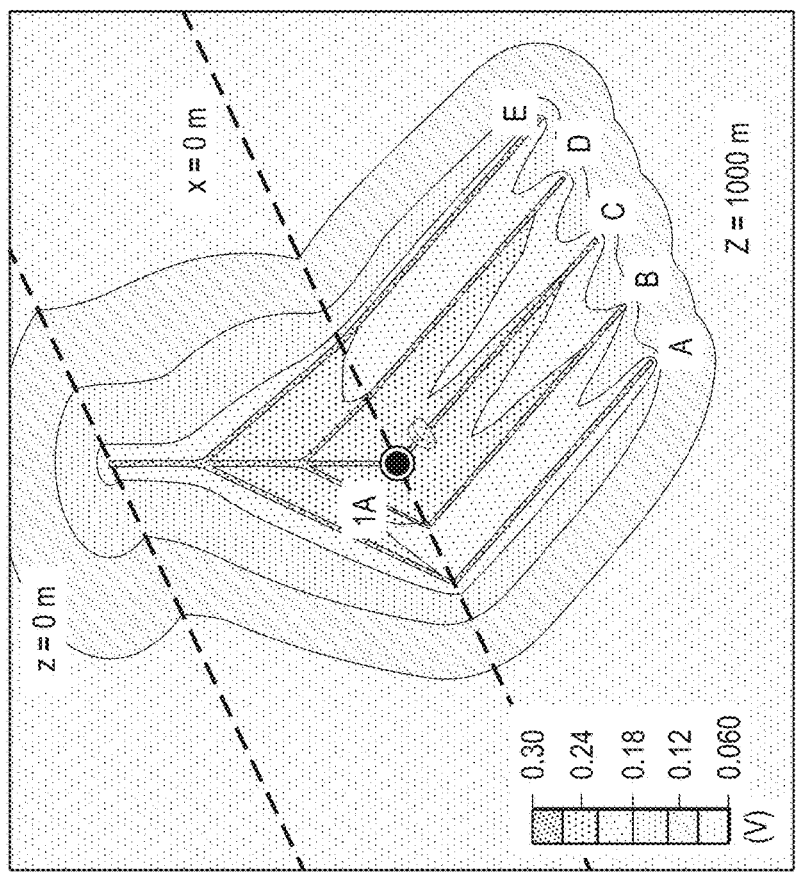
FIG. 11A, FIG. 11B, and FIG. 11C illustrate a total electric potential for the multilateral system in FIG. 9 and FIG. 10, with the addition of a fracture system represented by infinitesimally thin, facet-based conductivity model, located downhole from the heel in a well and in accordance with an illustrative embodiment.
Figure 11C:
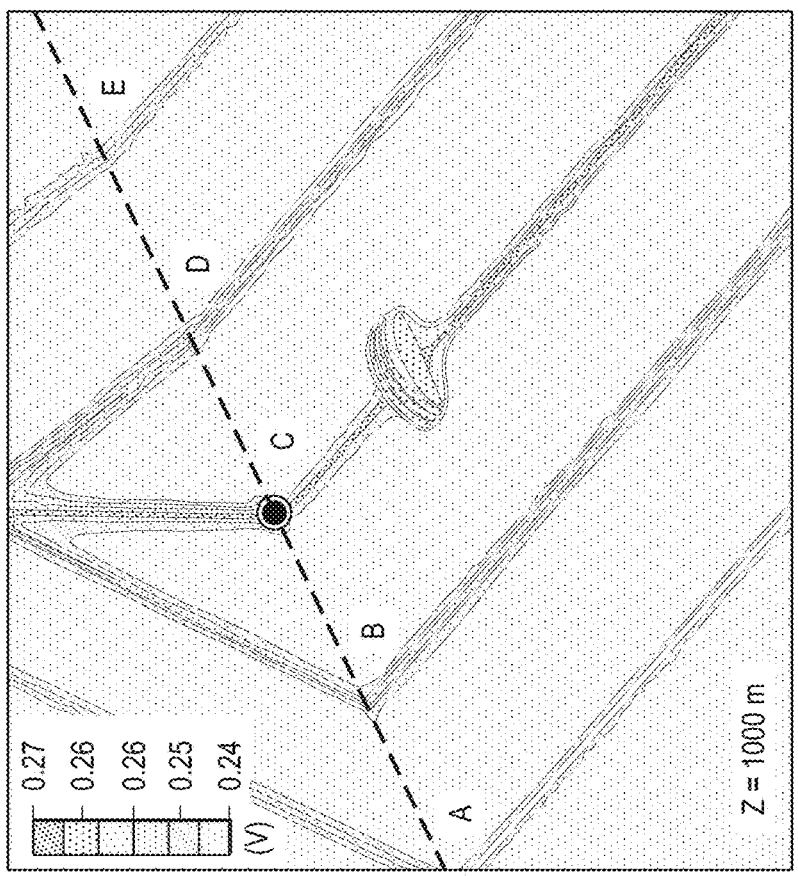
Figure 11B:
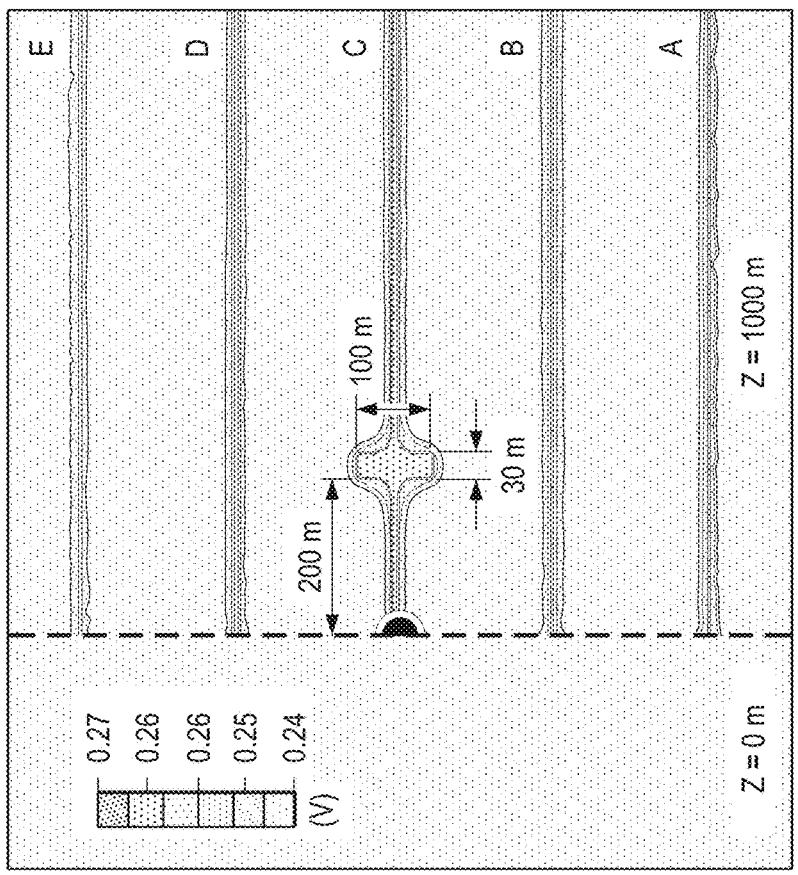

FIG. 11, constituted by FIG. 11A, FIG. 11B, and FIG. 11C, illustrates a total electric potential for the multilateral system in FIG. 9 and FIG. 10, with the addition of a fracture system represented by infinitesimally thin facet-based conductivity model, located downhole from the heel in a well and in accordance with an illustrative embodiment. FIG. 11A is an oblique view. FIG. 11B is middle view. FIG. 11C is a magnified oblique view. Fractures are introduced into the model as a set of four parallel ellipses, 100 m wide and 40 m tall, centered on the middle well of the multilateral system, 200 m from the heel with 10 m spacing.

Again, FIG. 11 represents the total electric potential for the multilateral system in FIGS. 9 and 10, with the addition of a fracture system located 200 m downhole from the heel in well C. Fractures are modeled as a set of four infinitesimally thin ellipses, 40 m tall and 100 m wide, with 10 m separation, oriented normal to the well bore. For each the fracture conductance s is 1 S.

Figure 12B:
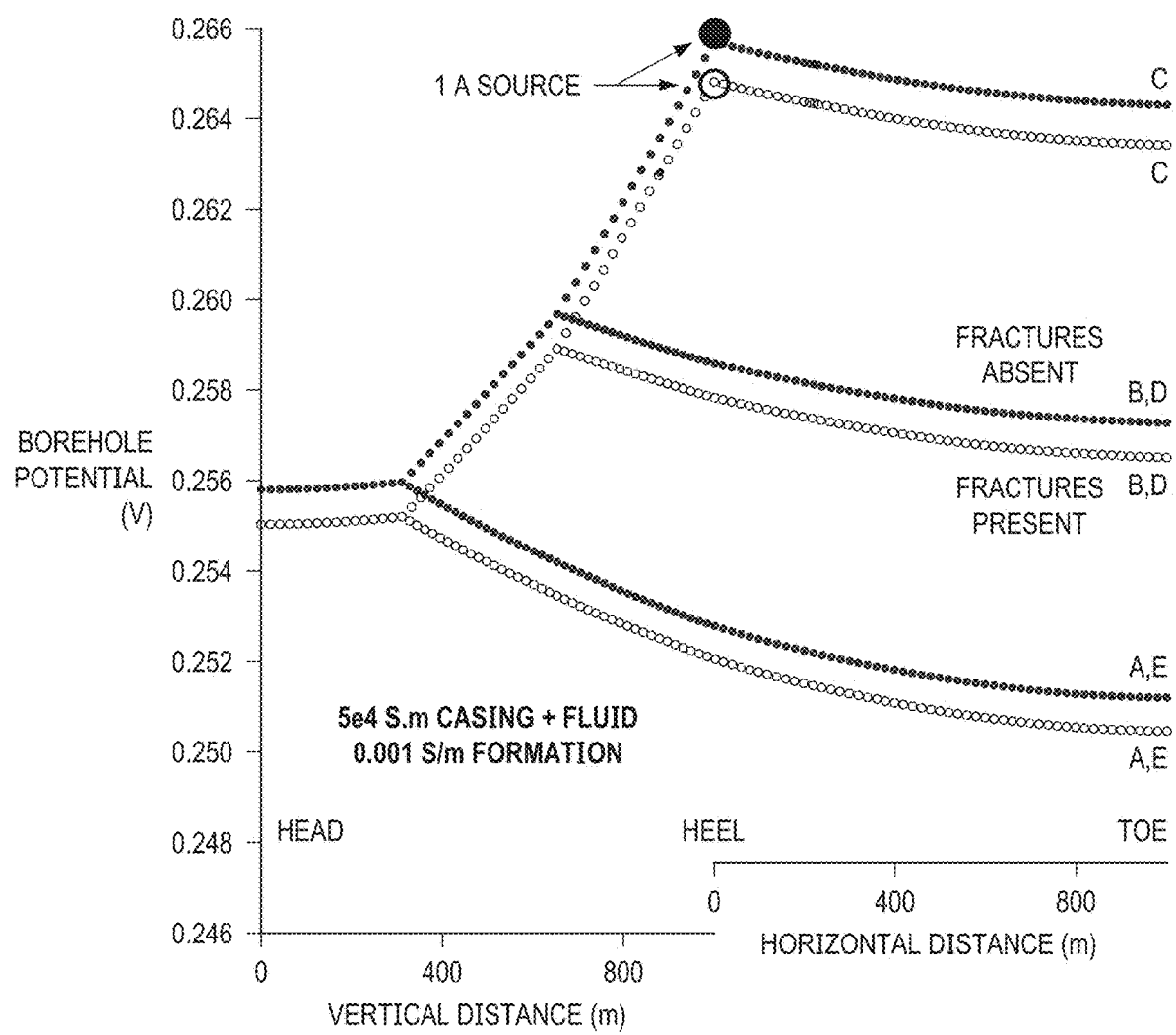

Taking a high end-member estimate of s=1 S total fracture conductance, the ellipses are discretized via triangular facets with 3 m edge length so that the elliptical shape is approximated to the first order. As was shown in Weiss et al. (2016), the effect of the fractures is to lower the overall potential of the connected casing system. See FIG. 12A and FIG. 12B, which illustrate effects of fractures on the casing voltages of well bores A-E for the model shown in FIG. 10 and FIG. 11, in accordance with an illustrative embodiment.

Figure 13:
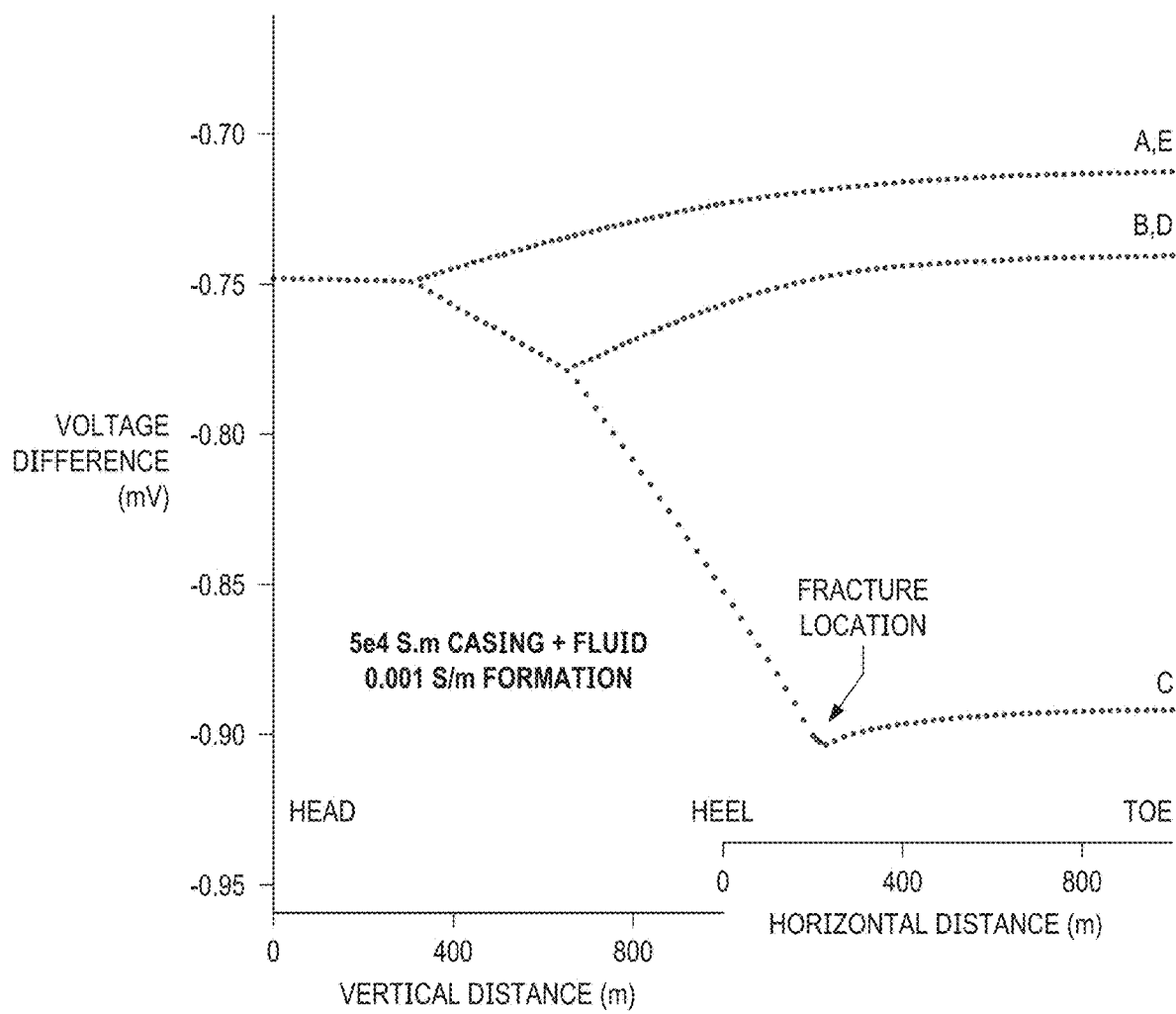
FIG. 13 illustrates a difference in the casing voltage on well bores for the fracture/no fracture results in FIG. 12, in accordance with an illustrative embodiment.

Although there is demonstrable leakage current in each of the modeling scenarios (fractures present and absent), the difference in casing potential between the two shows comparatively little along-casing variability, with the notable exception of the fracture location itself. See FIG. 13, which illustrates a difference in the casing voltage on well bores A-E for the fracture/no fracture results in FIG. 12, in accordance with an illustrative embodiment. This observation is consistent with the results in Weiss et al. (2016), where the voltage difference due to a fracture system can be reasonably approximated by a uniform line charge along the casing plus a point charge of opposite sign at the fracture location.

Figure 14:
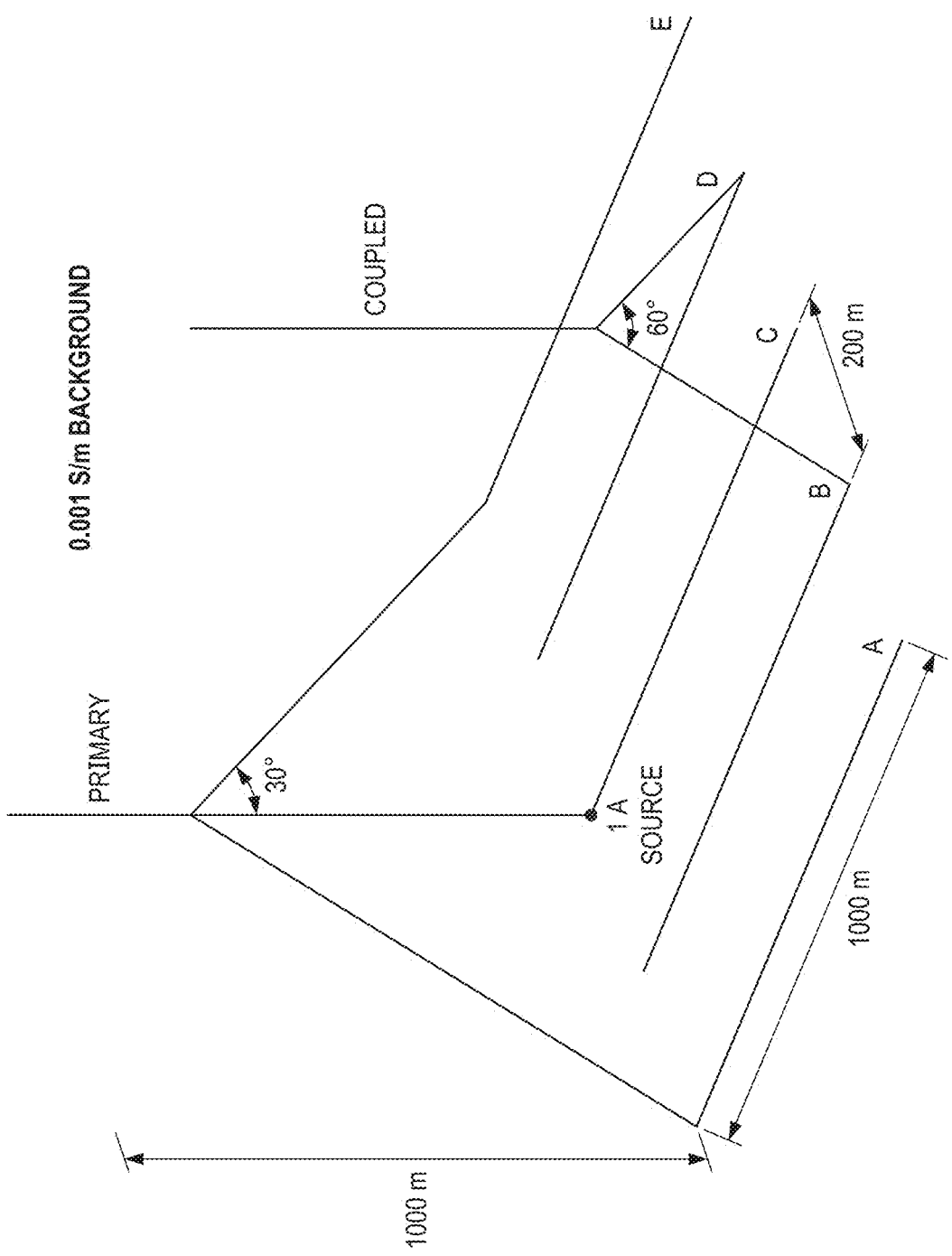
FIG. 14 illustrates a modification of a multilateral configuration in FIG. 9 in which two wells are galvanically coupled to three other wells, rather than in direct electrical contact through connected segments of the well casing, in accordance with an illustrative embodiment.

FIG. 14 illustrates a modification of a multilateral configuration in FIG. 9, in which wells B and D are galvanically coupled to wells A, C, and E, rather than in direct electrical contact through connected segments of the well casing. As a final set of numerical experiments, the multilateral system is modified such that the horizontal segments are interleaved from two independent down going wells but still offer the same coverage at the 1000 m depth (see FIG. 14).

In this design, the center and outermost wells are electrically connected through one vertical well, whereas the two intermediate wells are electrically isolated from the other three and are connected instead by another vertical well. This scenario allows for testing of the passive coupling between isolated, but nearby, wells and addresses the question of fracture mapping by adjacent wells. As in the previous example, we see that among the connected wells, the effect of the fractures is to reduce the overall casing potential as energy is leaked into formation by the fractures. In response, the two coupled wells each realize an increase in electric potential because they effectively capture the energy lost through the fracture (see FIG. 15A and FIG. 15B).

Figure 15A:
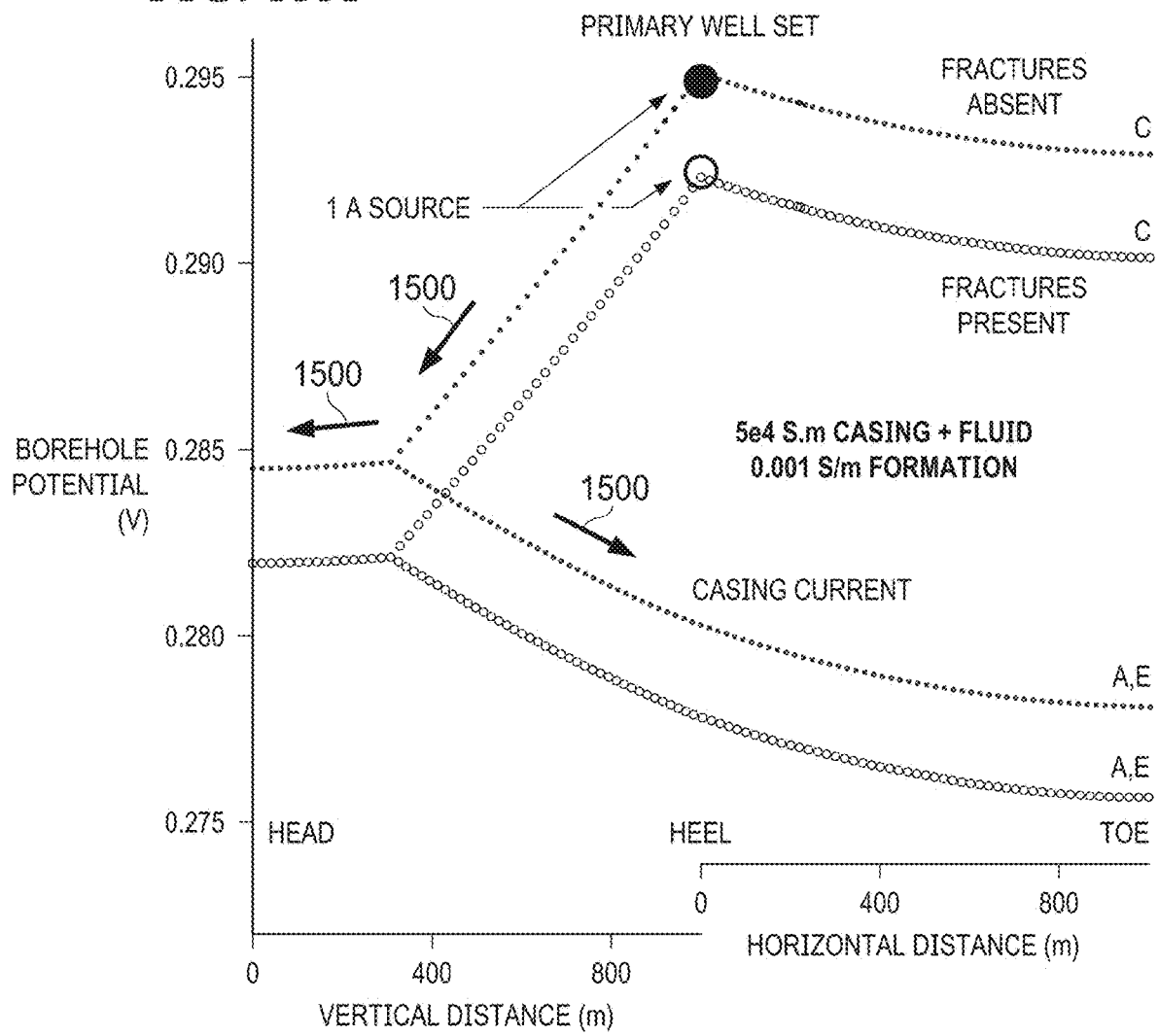

FIG. 15A shows the primary well set. FIG. 15B shows the coupled well set. The effect on the casing voltage for the galvanically coupled well system in FIG. 14, in which fractures are introduced 200 m from the heel of center well C from FIG. 11. FIG. 15A and FIG. 15B also show conductivity of the total conductivity-area product of the combined fluid-borehole system. Also shown (open arrows 1500) is the direction of the casing current given by the gradient of the casing potential.

Thus, the effect on the coupled wells is a voltage anomaly of opposite sign to that of the primary, fully connected wells. One also sees that the casing current in the horizontal section of the three primary wells is in the same direction as that in the two coupled wells (heel to toe in the primary wells is the same direction as toe to heel in the coupled wells). Voltage differences between the fracture/no-fracture case are similar to that seen before, with the observation that the voltage differences in the two coupled wells are much smaller than that in the three primary wells. See FIG. 16A and FIG. 16B.

FIG. 16A and FIG. 16B illustrate a difference in the casing voltage due to fractures in the galvanically coupled well system in FIG. 14, in accordance with an illustrative embodiment. These figures show a difference in the casing voltage due to fractures in the galvanically coupled well system in FIG. 14. Note that although in FIG. 16A there is a notable fracture signature on well C, in FIG. 16B there is no obvious signature on the neighboring wells B and D.

Estimates of the change in the electric field due on the air/Earth interface due the presence of fractures in these models show a considerable dependence on the well geometry. See FIG. 17.

Figure 17B:
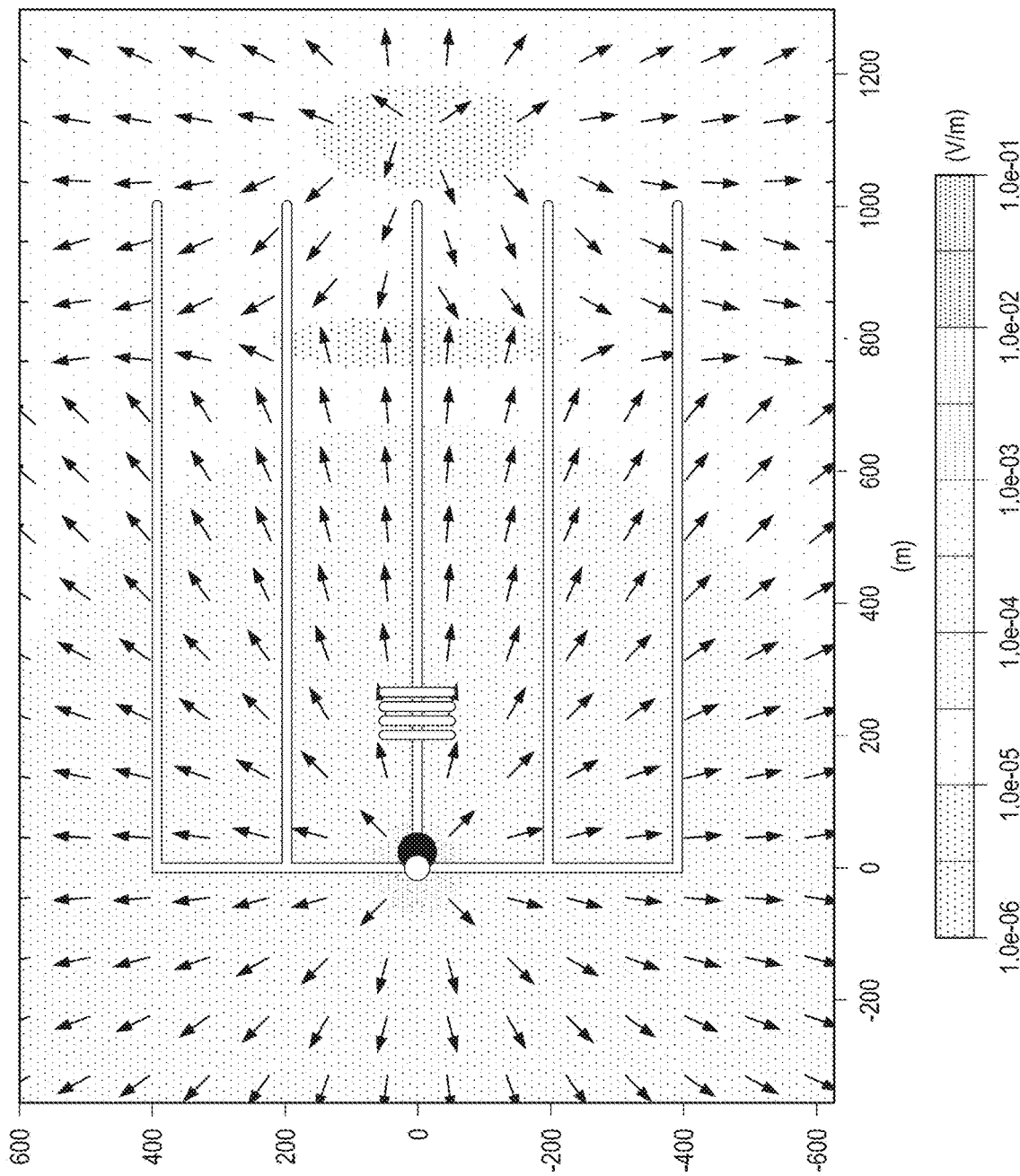
Figure 17C:
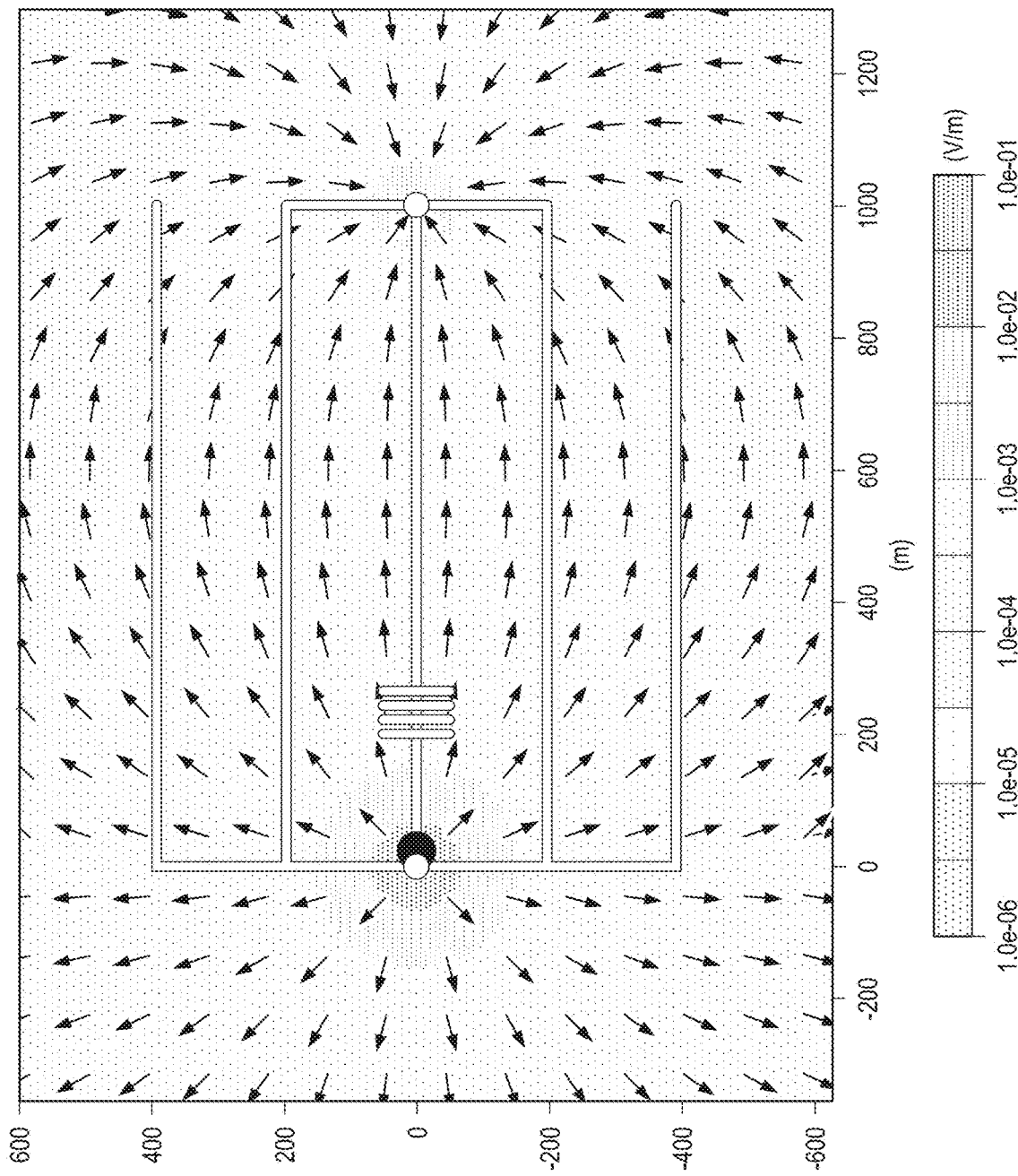

FIG. 17A, FIG. 17B, and FIG. 17C illustrate a plan view of differences in electric field on the air/Earth interface due to the presence of fractures for three different well systems where the well geometry is the same as in FIG. 9 and FIG. 14, in accordance with an illustrative embodiment. FIG. 17A shows the case of a single well. FIG. 17B shows the case of a multilateral well. FIG. 17C shows the case of a coupled multilateral well. Again, the well geometry is the same as in FIGS. 9 and 14.

In particular, it is seen that the overall magnitude in the difference signal is significantly reduced in the case of the multilateral system when compared with the case of a single well: an observation consistent with comparatively less leakage current in the single-well system. In addition, there is a low-amplitude anomaly over the toe of the fully connected multilateral system not seen in the single-well example, as in FIG. 17B. When a multilateral configuration is distributed between two vertical wells, as in FIG. 17C, the second vertical well connecting the two interleaved horizontal sections acts as a current sink, thus increasing the potential gradient along a line connecting the two well heads. This effective "source" and "sink" are consistent with the (vertical) gradient in difference voltage seen at the well head. See FIG. 16.

VI. DISCUSSION

A few remarks are first offered to address the computational burden of modeling the fractures and borehole in the preceding examples. Four elliptical fractures with minor and major axes 20 m and 50 m, respectively, have a combined surface area of $\pi \times 20 \times 50$ m²=approximately 3142 m². Discretized by (quasi) regular facets with an edge length of 3 m, the fractures require $N_F$=2616 facets for their summation in Equation 3. Furthermore, with borehole discretization on 20 m node spacing, the coupled multilateral well system requires $N_E$=457 edges in the third summation of Equation 3. Following Weiss (2001) and Weiss et al. (2016), the finite element linear system of equations is solved iteratively, where at each iteration, the action of the coefficient matrix is computed on the fly by summing over the elements; of which, there are $N_V$=3 million tetrahedra (490 k nodes) in the multilateral models. Hence, the number of additional floating point operations required for including the fractures and well casing is small and results in a statistically insignificant increase in runtime for these models. In contrast, the effect of high casing and fracture conductivity is to increase the condition number of the finite element coefficient matrix, thus reducing the rate at which a Jacobi-preconditioned conjugate gradient (PCCG) solver converges (see FIG. 18): an observation familiar to finite element practitioners. Run times for these models are on the order of a couple minutes, thoroughly unoptimized, on a MacBook Pro equipped with 16 GB memory and a dual-core 3 GHz Intel i7 CPU chip.

Figure 18:
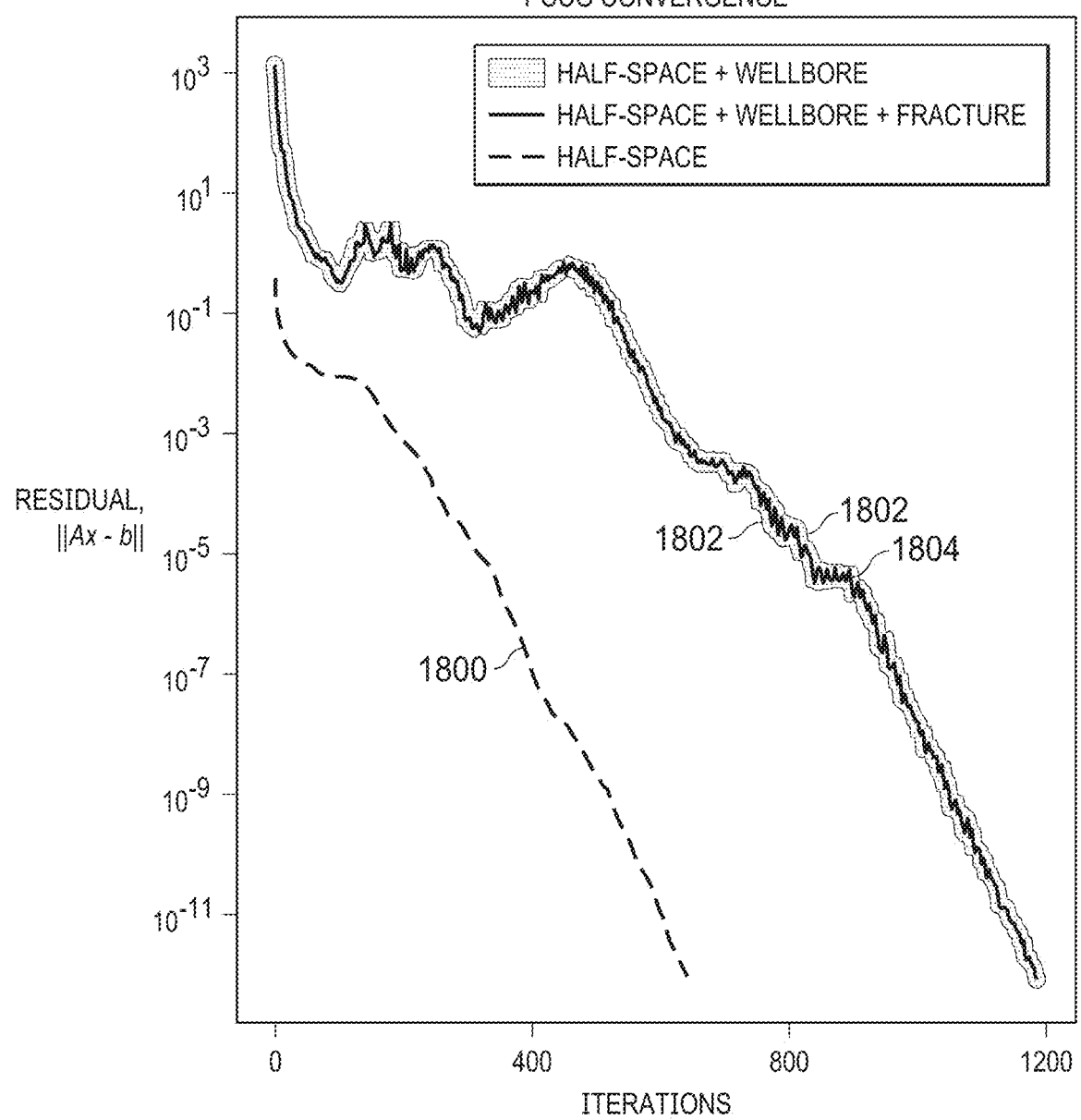
FIG. 18 illustrates convergence for discretization of the coupled multilateral model in FIG. 14, in accordance with an illustrative embodiment.

FIG. 18 illustrates convergence for discretization of the coupled multilateral model in FIG. 14, in accordance with an illustrative embodiment. Specifically, FIG. 18 shows convergence of the Jacobi-preconditioned conjugate gradient (PCCG) linear solver for discretization of the coupled multilateral model in FIG. 14. Not including the well and fractures in the conductivity model (Equation 3), results in a rapid convergence (dashed line 1800) to a target residual norm $1 \times 10^{-12}$. Including the high-conductivity well roughly doubles the number of iterations necessary to reach the same target residual (hashed area 1802), and further inclusion of fractures has no appreciable effect (solid line 1804).

Geologic settings with elevated fracture conductivity, such as in the previous examples, can result from either natural causes such as secondary mineralization or engineered experiments in which the fracture is filled with brine, a tracer fluid, or a conductive proppant. With regard to the latter, production and completion of unconventionals typically require proper accounting of the anisotropic effects of shales. Although the first term in Equation 3, in which the volume-based or tet-based conductivity term resides, is written as isotropic conductivity (the product of a scalar $\sigma_e$ with the rank-2 identity tensor), it is not clear that this is a necessary restriction. Rather, one is free to define the volume conductivity by a generalized, symmetric, rank-2 tensor in the (x, y, z) reference frame of the model domain. Doing so would allow for modeling transverse isotropic shales, of which there are only four degrees of freedom: two Euler angles describing the orientation of the bedding plane and two conductivity values representing the plane-parallel and plane-normal conductivities.

The benchmarking examples shown here demonstrate that hierarchical conductivity model Equation 3 is self-consistent and it generates results that agree with independent reference solutions when the facets and edges are relatively conductive with respect to the volume elements. However, it is also been shown that the jump discontinuity in electric potential across the face of thin resistive disk requires more of the finite element formulation than the modified model Equation 3. When used in the context of DC resistivity simulations, the conductivity model is accompanied by a suitable finite element discretization, one that admits step discontinuities, for the evaluation of an arbitrary conductivity structure.

The infinitesimally thin facets and edges pose some interesting opportunities regarding inversion and recovery of sharp features in the resulting conductivity model. Historically, recovery of sharp features or jumps has been achieved by introducing tears (surfaces informed by supplementary geologic information) in the Earth model, across which smoothness regularization is not enforced. Examples of this include fracture imaging (Robinson et al., 2013) and reservoir characterization (Hoversten et al., 2001). With the hierarchical conductivity model evaluated here, it is conceivable that an alternative inversion strategy may prove profitable: inverting for either $s_e$ or $t_e$ alone, perhaps with internal smoothing, to constrain the model to a specific subsurface region. Following the development of McGillivray et al. (1994) for adjoint sensitivities, it is straightforward to show that the Fréchet derivative of the potential difference between points A and B in the subsurface is given by $\int_{F_e} \nabla_{23}\tilde{u}\cdot\nabla_{23}u\, dx^2$ and $\int_{E_e} \nabla_1\tilde{u}\cdot\nabla_1 u\, dx$, for the "e"th facet and edge, respectively, where $\tilde{u}$ is the electric potential for the adjoint source $\tilde{f}=\delta(x-x_B)-\delta(x-x_A)$. These functions for the Fréchet derivatives are entirely analogous to the expressions required for three-dimensional sensitivity calculation, and they therefore pose little additional burden for their use in some previously developed inversion algorithm.

VII. CONCLUSION

A novel and computationally economical model for hierarchical electrical conductivity has been introduced and exercised in the context of finite element analysis of the DC resistivity problem on an unstructured tetrahedral mesh. Electrical properties are assigned not only to volume-based tetrahedra but also to infinitesimally thin facet-based and edge-based elements of the mesh, thus allowing an approximate, but geometrically conformable, representation of thin, strong conductors such as fractures and well casings. Numerical experiments show agreement between numerical solutions and independent analytic reference solutions.

Numerical experiments also show consistency in results between fine-scale discretization of thin structures and their surface- and edge-based counterparts. In the context of DC resistivity, the hierarchical model does not suitably capture the physics of infinitesimally thin resistors because of the intrinsic discontinuity in electric potential introduced therein. Rather, the physics of such resistive structures is shown to be reasonably captured through tears in the finite element mesh, which admit discrete jumps across a surface in the computational domain. Using the edge-based conductivity elements, a series of numerical experiments on a hypothetical and idealized multilateral production well illustrate the effect of well casing geometry, including coupling from neighboring wells, on casing voltage, suggesting that the actual casing conductivity should be accounted for in DC simulations of production/completion operations of an active oilfield.

Furthermore, introduction of fractures through facet-based elements into the multilateral simulation is shown to be computationally economical and to confirm the physics seen in previous simulations, in which the borehole casing and fractures were explicitly discretized through extreme meshing of many very small volume elements. Predicted measurements of the electric field on Earth's surface for single, multilateral, and coupled multilateral configurations show distinct patterns of amplitude and direction such that neglecting a complete model of subsurface well casing out of computational convenience or limited computational resources may strongly compromise the predictive value of the simulation result.

VIII. DERIVATION OF THE ELEMENT STIFFNESS MATRICES

Attention is now turned to the derivation of the element stiffness matrices, as mentioned above. The following discussion is made with reference to FIG. 19.

Figure 19:
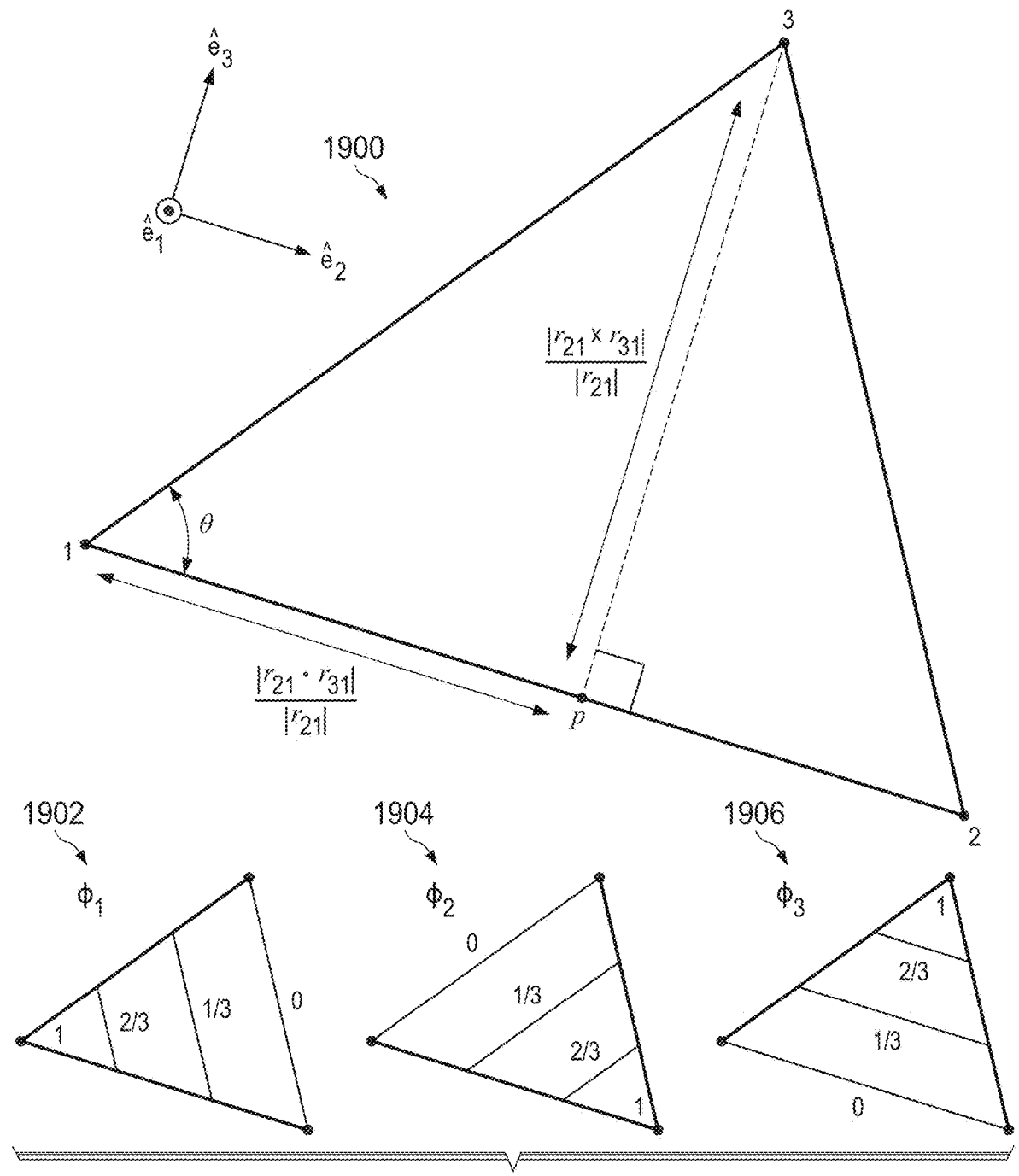
FIG. 19 illustrates a sketch of a facet and contours of corresponding nodal basis functions in local enumeration, in accordance with an illustrative embodiment.

FIG. 19 illustrates a sketch of a facet and contours of corresponding nodal basis functions in local enumeration, in accordance with an illustrative embodiment. At the top (area 1900) is shown facets and at the bottom (areas 1902, 1904, and 1906) is shown contours of its corresponding nodal basis functions in local enumeration. The length of the edge between nodes 1 and 3 projected in the $\hat{e}_2$ and $\hat{e}_3$ directions is annotated in the top figure (area 1900) in terms of operations on $r_{ji}=r_j-r_i$, the vector pointing from nodes i to j.

Recall from Equation 12 and the discussion that follows, that element stiffness matrix $K_e^3$ is formed by integration of $\nabla_{23}\phi_i(x)\cdot\nabla_{23}\phi_j(x)$ for i,j=1, 2, 3 over the triangular facet e. Gradients are taken in plane of the facet, denoted locally by the orthogonal direction vectors $\hat{e}_2$ and $\hat{e}_3$ (FIG. 1A). Although computing such gradients in two-dimensional is relatively straightforward and covered in most elementary texts on finite element analysis, the situation faced here, where facets are arbitrarily oriented in (x, y, z), is less common, and, therefore, merits some attention. Letting $x_2$ and $x_3$ be the local coordinates in the $\hat{e}_2$ and $\hat{e}_3$ directions, respectively, our goal is to evaluate $$\int_{F_e} \nabla_{23}\phi_i \cdot \nabla_{23}\phi_j dx^2 = \int_{F_e}\left(\frac{\partial\phi_i\partial\phi_j}{\partial x_2 \partial x_2} + \frac{\partial\phi_i\partial\phi_j}{\partial x_3 \partial x_3}\right)dx_2 dx_3 \quad \text{(Equation A-1)}$$

over the triangular facet $F_e$. Values of this integral constitute the ijth element of the 3×3 matrix $K_e^3$. By choosing $\hat{e}_2$ parallel with the facet edge connecting nodes 1 and 2, we see from Equation A1 that all derivatives with respect to $x_2$ are simple to compute and are given by $$\frac{\partial\phi_1}{\partial x_2} = \frac{-1}{|r_{21}|}, \frac{\partial\phi_2}{\partial x_2} = \frac{1}{|r_{21}|}, \text{ and } \frac{\partial\phi_3}{\partial x_2} = 0 \quad \text{(Equation A-2)}$$

where $r_{ji}=r_j-r_i$ is the vector pointing from nodes i to j. Note that these vectors need not be specified in the local ($x_2$, $x_3$) coordinate system, but rather may conveniently remain in some global (x, y, z) reference frame because norms, dots, and cross products are invariant under coordinate transformation. Calculation of the derivatives with respect to $x_3$ is slightly more involved, so start by observing that the distance between node 3 and the line connecting nodes 1 and 2 is $|r_{31}|\sin\theta = |r_{21} \times r_{31}|/|r_{21}|$, whereupon it is clear that $$\frac{\partial \phi_3}{\partial x_3} = \frac{|r_{21}|}{|r_{21} \times r_{31}|} \qquad \text{(Equation A-3)}$$

To determine derivatives of $\phi_1$, refer to Equation A-1 and observe that $|r_{31}|\cos\theta = r_{21} \cdot r_{31}/|r_{21}|$ takes on values of zero to $|r_{21}|$ as point p varies between nodes 1 and 2. Therefore, the quantity $$1 - \frac{r_{21} \cdot r_{31}}{|r_{21}|^2} \qquad \text{(Equation A-4)}$$

describes a linear function of position along the line connecting nodes 1 and 2, whose value is unity at node 1 and zero at node 2. One can now immediately write the remaining derivatives in Equation A-1 as:

$$\frac{\partial \phi_1}{\partial x_3} = \left(\frac{r_{21} \cdot r_{31}}{|r_{21}|^2} - 1\right)\left(\frac{|r_{21}|}{|r_{21} \times r_{31}|}\right) \text{ and} \qquad \text{(Equation A-5)}$$

$$\frac{\partial \phi_2}{\partial x_3} = -\frac{r_{21} \cdot r_{31}}{|r_{21}|^2}\left(\frac{|r_{21}|}{|r_{21} \times r_{31}|}\right).$$

To simplify notation, let $$a = \frac{-1}{|r_{21}|}, \; b = \frac{r_{21} \cdot r_{31}}{|r_{21}|^2}, \text{ and } c = \frac{|r_{21}|}{|r_{21} \times r_{31}|} \qquad \text{(Equation A-6)}$$

and denote the area of the facet by $\Delta = (\frac{1}{2})|r_{21} \times r_{31}|$. The element-stiffness matrix for a given facet e in Equation 13 is $$K_e^3 = \Delta \begin{pmatrix} a^2 + (b-1)^2 c^2 & -a^2 - (b-1)bc^2 & (b-1)c^2 \\ -a^2 - (b-1)bc^2 & a^2 + b^2 c^2 & -bc^2 \\ (b-1)c^2 & -bc^2 & c^2 \end{pmatrix} \qquad \text{(Equation A-7)}$$

Derivation of edge-based element-stiffness matrix $K_e^2$ in Equation 13 is far less involved than for the facet-based case Equation A-7. Referring back to FIG. 1, where $\hat{e}_1$ is parallel to the edge connecting nodes 1 and 2, one sees that $\nabla_1 \phi_1 = \phi_1' = -1/|r_{21}|$ and $\nabla_1 \phi_2 = \partial_{x_1}\phi_2 = 1/|r_{21}|$. Therefore, evaluation of $$\int_{E_e} \nabla_1 \phi_i \cdot \nabla_1 \phi_j dx = \int_{E_e} \frac{\partial \phi_i}{\partial x_1}\frac{\partial \phi_j}{\partial x_1} dx_1 \qquad \text{(Equation A-8)}$$

over the "e"th edge is trivial, and one finds $$K_e^2 = \frac{1}{|r_{21}|}\begin{pmatrix} 1 & -1 \\ -1 & 1 \end{pmatrix} \qquad \text{(Equation A-9)}$$

IX. ADDITIONAL APPLICATIONS

The illustrative embodiments described above are made with respect to oil drilling operations, including but not limited monitoring and modeling both processes and structures in wellbores. In the above illustrative embodiments, such processes may include, but are not limited to, fracking, drilling, waste storage, waste disposal, and other such processes. In the above illustrative embodiments, modeled features or structures may include, but are not limited to, thin plates, cylindrical well casings, fault lines in the Earth, discontinuities, cracks, and other natural and man-made phenomenon found under the ground or near the air/ground interface.

Additionally, the illustrative embodiments may be used to process other data obtained from sensors for which finite element modeling is used to characterize and/or model other processes and structures. For example, the illustrative embodiments could be used with underground sensing equipment such as ground penetrating radar to find and characterize mines in a military application. The illustrative embodiments could be used with other sensors to model objects sensed through concrete walls in a law enforcement application. The illustrative embodiments may be used in an engineering application to, for example, model thermal expansion of spacecraft upon reentry, to model performance of aircraft, or many other engineering applications.

The illustrative embodiments may be used, most generally, to aid in any finite element modeling application where computationally explosive calculations arise as a result of attempting to characterize very thin objects or processes. Thus, the examples provided above do not necessarily limit the claimed inventions or other illustrative embodiments described herein.

Figure 20:
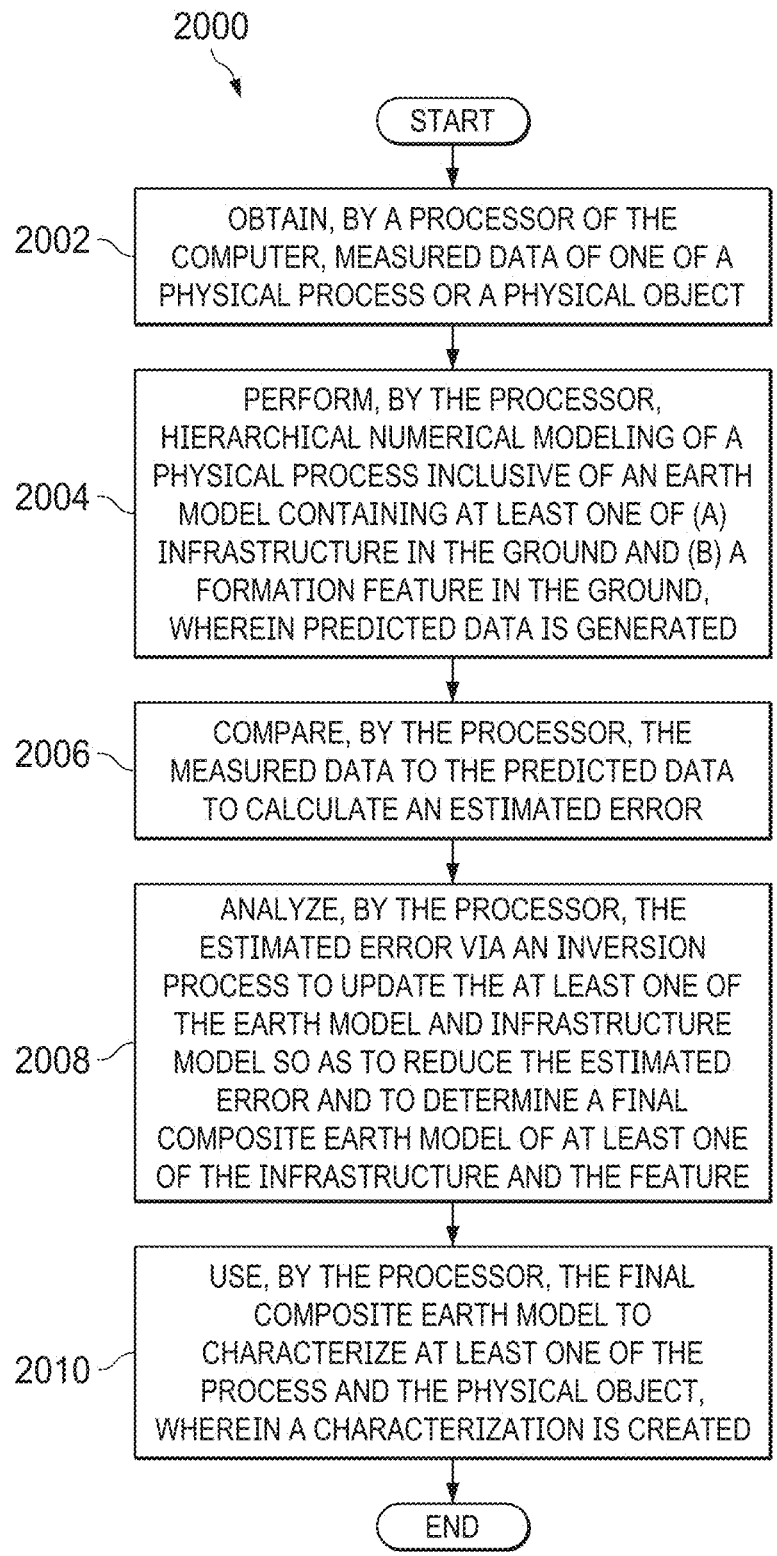
FIG. 20 illustrates a computer-implemented method of preventing computationally explosive calculations arising solely in a computer as a result of the computer modeling a feature or a process in the ground, in accordance with an illustrative embodiment.

FIG. 20 illustrates a computer-implemented method of preventing computationally explosive calculations arising solely in a computer as a result of the computer modeling a feature or a process in the ground, in accordance with an illustrative embodiment. Method 2000 may be implemented using a data processing system, such as data processing system 2100 of FIG. 21. Method 2000 may be accomplished using the mathematical techniques described with respect to FIG. 1 through FIG. 19. Method 2000 may be characterized as a computer-implemented method of preventing computationally explosive calculations arising solely in a computer as a result of the computer modeling a feature or a process in the ground.

Method 2000 may begin by obtaining, by a processor of the computer, measured data of one of a physical process or a physical object (operation 2002). Method 2000 may also include performing, by the processor, hierarchical numerical modeling of a physical process inclusive of an Earth model containing at least one of (a) infrastructure in the ground and (b) a formation feature in the ground, wherein predicted data is generated (operation 2004). Method 2000 may also include comparing, by the processor, the measured data to the predicted data to calculate an estimated error (operation 2006).

Method 2000 may also include analyzing, by the processor, the estimated error via an inversion process to update the at least one of the Earth model and infrastructure model so as to reduce the estimated error and to determine a final composite Earth model of at least one of the infrastructure and the feature (operation 2008). Method 2000 may also include using, by the processor, the final composite Earth model to characterize at least one of the process and the physical object, wherein a characterization is created (operation 2010). In one illustrative embodiment, the method may terminate thereafter.

Method 2000 may be varied. For example, for method 2000, at least the physical process is characterized. In this case, method 2000 also includes monitoring, by the processor, the physical process over time; and controlling, by the processor, equipment to adjust the physical process based on changes to the final composite Earth model. The equipment may include drilling equipment including, but not limited to telemetry equipment, fluid injection equipment, casing perforation equipment, casing integrity diagnostic equipment, fracking equipment, and many others. The equipment may also include other types of equipment used in fields other than drilling and oilfield geophysics, including but not limited to ground penetrating RADAR, ultrasonic detection, and many others.

In another illustrative embodiment, the physical process includes measurement of at least one parameter selected from the group consisting of: electromagnetic fields, electro-magneto static fields, gravity fields, temperature, pressure, fluid flow, microdeformation, and a method of geophysical and environmental sensing. In yet another illustrative embodiment, the physical process is selected from the group consisting of: oilfield management, oilfield exploration, and development activities selected from the group consisting of: drilling a well, stimulating a well, hydraulically fracturing a well, control of a hydraulic fracturing, intelligent well design, intelligent well completion, control of fluid injection, control of fluid production, geosteering, measurement while drilling and well bore telemetry from at least one well. In still another illustrative embodiment, the inversion process is either a deterministic algorithm or a stochastic algorithm executed on the computer, and wherein the computer comprises one of specialized purpose-built computing hardware, an interface to a second computer, or purpose-built computing hardware.

In a different illustrative embodiment, the Earth model includes one of a geologic structure and a man-made structure; the geologic structures are selected from the group consisting of: a hydrocarbon reservoir, a mineral deposit, a water aquifer, a waste containment facility, a cap rock, a clay lens, a salt body; and man-made structure is selected from the group consisting of: a drill string, a well casing, a well completion, a pipeline, a storage tank, an electrical cable, a wireline cable, a transportation rail line, a power line, and a fence; and the formation feature includes a geologic structure whose physical dimension in one or more directions is small relative to surrounding geologic structures, wherein the formation feature is selected from the group consisting of a fracture, a lineation, a fault, or a thin bed. Continuing this example, at least one of the hydrocarbon reservoir and the Earth model includes a fracture, either naturally occurring or engineered by an external process, containing an electromagnetic contrast agent, wherein the contrast agent is selected from the group consisting of: a fluid, a gas, a solid, or a combination thereof, and wherein the contrast agent further contains an engineered device, material or biological agent capable of active geophysical signal transmission or measurable geophysical response to physical, chemical, thermal, or radioactive stimulation.

In a still different illustrative embodiment, the hierarchical numerical modeling is based upon at least one of: a finite difference method, a finite volume method, a finite element method, a boundary element method, a spectral method, a spectral element method, an integral equation method, or a stochastic method. In another illustrative embodiment, characterizing the formation feature or the infrastructure as edges and facets within a volume-based model discretization includes characterizing as an unstructured tetrahedral, hexahedral, or Voronoi mesh and using a hierarchical material properties model. In a related illustrative embodiment, using the hierarchical material properties model further comprises augmenting material property values on volumetric mesh elements by facet and edge-based material properties on regions between volumetric elements, wherein the material property values are for at least one of an electrical conductivity, an electric permittivity, and a magnetic permeability, or their reciprocals.

In a different illustrative embodiment, the hierarchical finite element model includes physical material properties of at least of one Earth materials and engineered materials, wherein the material property values are for at least one of an electrical conductivity, an electric permittivity, and a magnetic permeability, or their reciprocals. In a related illustrative embodiment, regions between elements are infinitesimally thin.

In a geologic application, the illustrative embodiments contemplate that the characterization comprises calculating a shape of the feature approximated by a set of connected edges on which a first product of cross-sectional area and material property or material property itself is explicitly defined. In another geologic calculation, the illustrative embodiments contemplate that the characterization comprises calculating a shape of the feature approximated by a set of connected facets that, together, warp and bend with a mesh topology and on which a product of thickness and material property is explicitly defined. In either case, utilizing may cause the feature to be represented by infinitesimally thin, arbitrarily oriented and connected facets and edges of the model, thereby eliminating a need for computationally explosive volumetric discretization of the feature or infrastructure.

In a yet different illustrative embodiment, the process may include monitoring at least one of subsurface facilities and activities related to storage, disposal or dispersal of materials selected from the group consisting of carbon dioxide, water, petrochemicals, nuclear waste, chemical waste, and hydrocarbons.

Additionally, in another illustrative embodiment, the process may include monitoring at least one of subsurface facilities and activities related to military or law enforcement interests selected from the group consisting of a bunker, a silo, a tunnel, a control center, and a perimeter enforcement structure. In either case, the process may include active propagation of geophysical signals into subsurface facilities.

The illustrative embodiments also contemplate that the process may include exploiting infrastructure for signal propagation into physically inaccessible regions. Thus, the illustrative embodiments include numerous possible alternatives. Accordingly, the illustrative embodiments described herein do not necessarily limit the claimed inventions, unless so explicitly recited.

Figure 21:
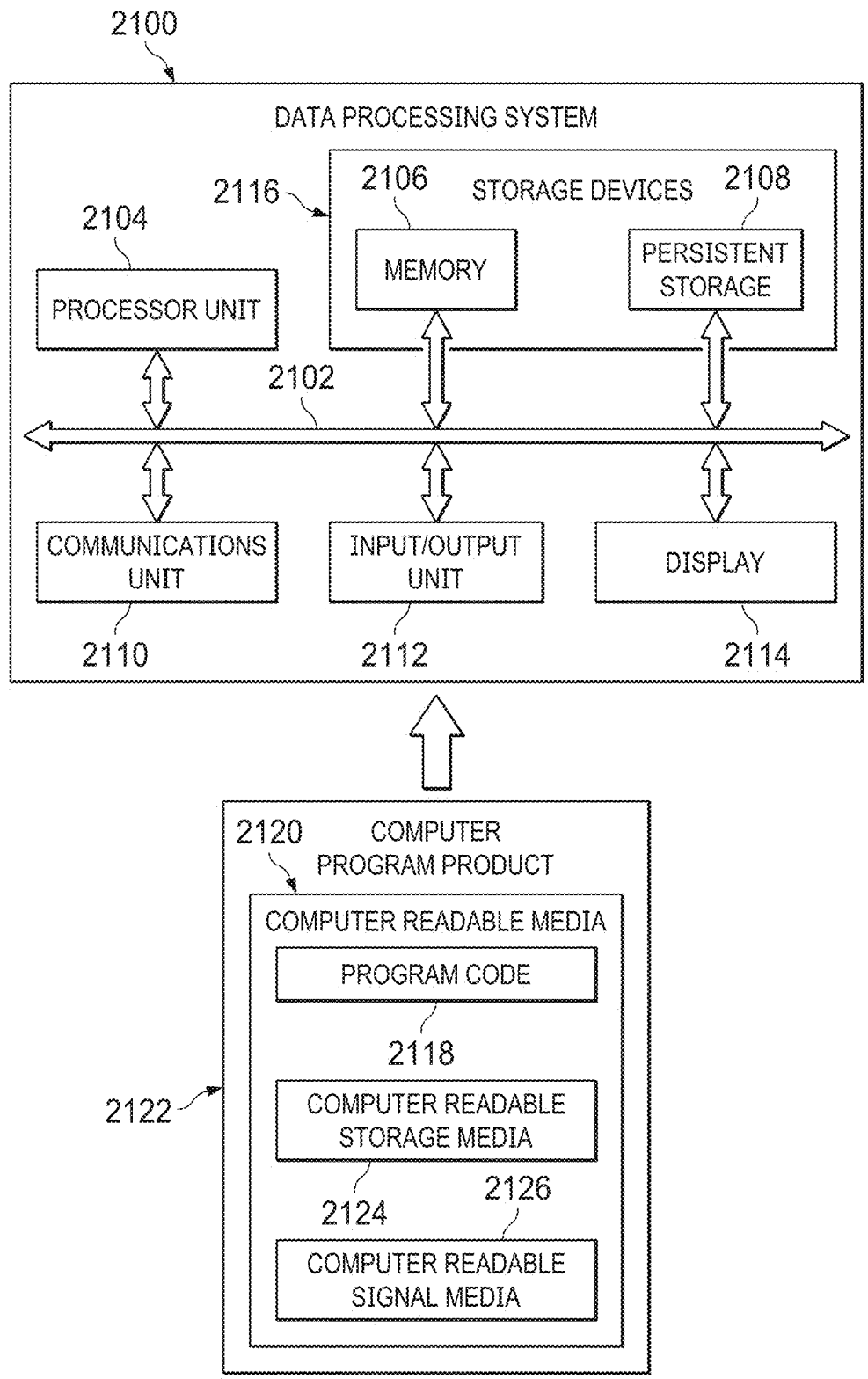
FIG. 21 illustrates a data processing system, in accordance with an illustrative embodiment.

Turning now to FIG. 21, an illustration of a data processing system is depicted in accordance with an illustrative embodiment. Data processing system 2100 in FIG. 21 is an example of a data processing system that may be used to implement the illustrative embodiments, such as those described with respect to FIG. 1 through FIG. 20. In this illustrative example, data processing system 2100 includes communications fabric 2102, which provides communications between processor unit 2104, memory 2106, persistent storage 2108, communications unit 2110, input/output (I/O) unit 2112, and display 2114.

Processor unit 2104 serves to execute instructions for software that may be loaded into memory 2106. This software may be an associative memory, content addressable memory, or software for implementing the processes described elsewhere herein. Thus, for example, software loaded into memory 2106 may be software for executing method 2000 of FIG. 20.

Processor unit 2104 may be a number of processors, a multi-processor core, or some other type of processor, depending on the particular implementation. A number, as used herein with reference to an item, means one or more items. Further, processor unit 2104 may be implemented using a number of heterogeneous processor systems in which a main processor is present with secondary processors on a single chip. As another illustrative example, processor unit 2104 may be a symmetric multi-processor system containing multiple processors of the same type.

Memory 2106 and persistent storage 2108 are examples of storage devices 2116. A storage device is any piece of hardware that is capable of storing information, such as, for example, without limitation, data, program code in functional form, and/or other suitable information either on a temporary basis and/or a permanent basis. Storage devices 2116 may also be referred to as computer readable storage devices in these examples. Memory 2106, in these examples, may be, for example, a random access memory or any other suitable volatile or non-volatile storage device. Persistent storage 2108 may take various forms, depending on the particular implementation.

For example, persistent storage 2108 may contain one or more components or devices. For example, persistent storage 2108 may be a hard drive, a flash memory, a rewritable optical disk, a rewritable magnetic tape, or some combination of the above. The media used by persistent storage 2108 also may be removable. For example, a removable hard drive may be used for persistent storage 2108.

Communications unit 2110, in these examples, provides for communications with other data processing systems or devices. In these examples, communications unit 2110 is a network interface card. Communications unit 2110 may provide communications through the use of either or both physical and wireless communications links.

Input/output (I/O) unit 2112 allows for input and output of data with other devices that may be connected to data processing system 2100. For example, input/output (I/O) unit 2112 may provide a connection for user input through a keyboard, a mouse, and/or some other suitable input device. Further, input/output (I/O) unit 2112 may send output to a printer. Display 2114 provides a mechanism to display information to a user.

Instructions for the operating system, applications, and/or programs may be located in storage devices 2116, which are in communication with processor unit 2104 through communications fabric 2102. In these illustrative examples, the instructions are in a functional form on persistent storage 2108. These instructions may be loaded into memory 2106 for execution by processor unit 2104. The processes of the different embodiments may be performed by processor unit 2104 using computer implemented instructions, which may be located in a memory, such as memory 2106.

These instructions are referred to as program code, computer usable program code, or computer readable program code that may be read and executed by a processor in processor unit 2104. The program code in the different embodiments may be embodied on different physical or computer readable storage media, such as memory 2106 or persistent storage 2108.

Program code 2118 is located in a functional form on computer readable media 2120 that is selectively removable and may be loaded onto or transferred to data processing system 2100 for execution by processor unit 2104. Program code 2118 and computer readable media 2120 form computer program product 2122 in these examples. In one example, computer readable media 2120 may be computer readable storage media 2124 or computer readable signal media 2126. Computer readable storage media 2124 may include, for example, an optical or magnetic disk that is inserted or placed into a drive or other device that is part of persistent storage 2108 for transfer onto a storage device, such as a hard drive, that is part of persistent storage 2108. Computer readable storage media 2124 also may take the form of a persistent storage, such as a hard drive, a thumb drive, or a flash memory, that is connected to data processing system 2100. In some instances, computer readable storage media 2124 may not be removable from data processing system 2100.

Alternatively, program code 2118 may be transferred to data processing system 2100 using computer readable signal media 2126. Computer readable signal media 2126 may be, for example, a propagated data signal containing program code 2118. For example, computer readable signal media 2126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 2118 may be downloaded over a network to persistent storage 2108 from another device or data processing system through computer readable signal media 2126 for use within data processing system 2100. For instance, program code stored in a computer readable storage medium in a server data processing system may be downloaded over a network from the server to data processing system 2100. The data processing system providing program code 2118 may be a server computer, a client computer, or some other device capable of storing and transmitting program code 2118.

The different components illustrated for data processing system 2100 are not meant to provide architectural limitations to the manner in which different embodiments may be implemented. The different illustrative embodiments may be implemented in a data processing system including components in addition to or in place of those illustrated for data processing system 2100. Other components shown in FIG. 21 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 2104 may take the form of a hardware unit that has circuits that are manufactured or configured for a particular use. This type of hardware may perform operations without needing program code to be loaded into a memory from a storage device to be configured to perform the operations.

For example, when processor unit 2104 takes the form of a hardware unit, processor unit 2104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 2118 may be omitted because the processes for the different embodiments are implemented in a hardware unit.

In still another illustrative example, processor unit 2104 may be implemented using a combination of processors found in computers and hardware units. Processor unit 2104 may have a number of hardware units and a number of processors that are configured to run program code 2118. With this depicted example, some of the processes may be implemented in the number of hardware units, while other processes may be implemented in the number of processors.

As another example, a storage device in data processing system 2100 is any hardware apparatus that may store data. Memory 2106, persistent storage 2108, and computer readable media 2120 are examples of storage devices in a tangible form.

In another example, a bus system may be used to implement communications fabric 2102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 2106, or a cache, such as found in an interface and memory controller hub that may be present in communications fabric 2102.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The following are considered alternative embodiments of the embodiments described above, and of the inventions claimed below. The illustrative embodiments also provide for a method of preventing computationally explosive calculations arising solely in a computer as a result of the computer modeling a feature in the ground. The method includes receiving, at the computer, data from a ground penetrating sensing device; and determining, by the computer processing the data, a location and a characterization of a feature in the ground by characterizing the feature as edges and facets associated with the feature's material properties; wherein characterizing the feature as edges and facets avoids volumetric finite element modeling of the feature and thereby prevents the computationally explosive calculations associated with modeling the feature from the data using the finite element modeling with only volume-based representations of feature.

The illustrative embodiments also include characterizing the feature as edges and facets further comprises using a hierarchical electrical model for unstructured tetrahedral, hexahedral, or Voronoi finite element meshes. Continuing this example, the illustrative embodiments also include wherein using the hierarchical electrical model further comprises augmenting volume-based material property (conductivity, permittivity, permeability or their reciprocals) on tetrahedra, hexahedra, or Voronoi cells by facet and edge-based material property on regions between volumetric elements. In an alternative continuing example, the illustrative embodiments also include wherein the hierarchical finite element model includes both magnetic permeability and/or dielectric permittivity and their reciprocals.

Continuing to build on this example, the illustrative embodiments also include the illustrative embodiments also include wherein the regions between elements are infinitesimally thin. Building on this prior example, the illustrative embodiments also include wherein the characterization comprises calculating a shape of the feature approximated by a set of connected edges on which the product of cross-sectional area and material property (conductivity, permittivity, permeability or their reciprocals) and/or the material properties alone, is explicitly defined. In an alternative building on the infinitesimally thin regions, the illustrative embodiments also include wherein the characterization comprises calculating a shape of the feature approximated by a set of connected facets, that, together, warp and bend with a mesh topology and on which the product of thickness and material property (conductivity, permittivity, permeability or their reciprocals) and/or the material properties alone, is explicitly defined.

Returning to the beginning example, the illustrative embodiments also include wherein the feature comprises electrically conductive and/or dielectric, and/or magnetically permeable infrastructure and/or manmade objects. Building on this example, the illustrative embodiments also include wherein the conductive and/or dielectric and/or permeable infrastructure is selected from the group consisting of a borehole casing, a metal wire, a metal plate, fencing, rail track, cable, pipeline, and other related man-made objects and combinations thereof.

Returning to the beginning example, the illustrative embodiments also include wherein the feature comprises one of a natural fault line and/or a natural fault plane located in the ground.

Returning to the beginning example, the illustrative embodiments also include, for determining feature, generating a geo-electrical model based on photogrammetry, field mapping, seismic imaging, and/or other geophysical ground sensing, subsurface sensing, above/below-ground reconnaissance methods; and supplementing the geo-electrical model with metadata describing the features. Alternatively, the illustrative embodiments also include wherein the metadata is selected from the group consisting of coordinates of the feature, a size of the feature, a composition of the feature, a shape of the feature, and combinations thereof.

Continuing this immediate example, the illustrative embodiments also include wherein a finite element discretization mesh of the feature is constructed whose edges and facets are constrained by the metadata. In the alternative, determining further comprises: combining an association of the feature metadata in terms of material properties with geo-electrical properties of volume elements of the model, formation evaluation equipment, and formation production equipment.

In a further continuation of this example, the illustrative embodiments also include utilizing a material property hierarchy of the model in a three-dimensional finite element calculation by modification of global mass and stiffness matrices to include facet and edge based element matrices at locations where the feature resides in the model. Alternatively, the illustrative embodiments also include wherein utilizing causes the feature to be represented by infinitesimally thin, arbitrarily oriented and connected facets and edges of the model, thereby eliminating a need for volumetric discretization of the feature.

The illustrative embodiments also contemplate a computer program product in the form of a non-transitory computer recordable storage medium which stores program code for executing the above computer-implemented methods. The illustrative embodiments also contemplate a computer having a processor and a non-transitory computer recordable storage medium which stores program code for executing the above computer-implemented methods. Thus, the illustrative embodiments are not necessarily limited by the examples provided above.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The following References are incorporated herein in their entireties.

Commer, M., G. M. Hoversten, and E. S. Um, 2015, Transient-electromagnetic finite-difference time-domain Earth modeling over steel infrastructure: Geophysics, 80, no. 2, E147-E162, doi: 10.1190/GEO2014-0324.1.

Daily, W., A. Ramirez, R. L. Newmark, and K. Masica, 2004, Low-cost reservoir tomographs of electrical resistivity: The Leading Edge, 23, 472-480, doi: 10.1190/1.1756837.

Everett, M. E., E. A. Badea, L. Shen, G. Merchant, and C. J. Weiss, 2001, 3-D finite element analysis of induction logging in a dipping formation: IEEE Transactions on Geoscience and Remote Sensing, 39, 2244-2252, doi: 10.1109/36.957287.

Fitterman, D. V., 1989, What pipes can do to your transient EM interpretation: 59th Annual International Meeting, SEG, Expanded Abstracts, 219-221, doi: 10.1190/1.1889587.

Fitterman, D. V., F. C. Frischknecht, A. T. Mazzella, and W. L. Anderson, 1990, Example of transient electromagnetic soundings in the presence of oil field pipes: Geotechnical and Environmental Geophysics, 2, 79-88.

Haber, E., C. Schwarzbach, and R. Shekhtman, 2016, Modeling electromagnetic fields in the presence of casing: 86th Annual International Meeting, SEG, Expanded Abstracts, 959-964, doi: 10.1190/sebam2016-13965568.1.

Hohmann, G. W., 1971, Electromagnetic scattering by conductors in the Earth near a line source of current: Geophysics, 36, 101-131, doi: 10.1190/1.1440150.

Hoversten, G. M., M. Commer, E. Haber, and C. Schwarzbach, 2015, Hydro-frac monitoring using time-domain electromagnetics: Geophysical Prospecting, 63, 1508-1526, doi: 10.1111/1365-2478.12300.

Hoversten, G. M., G. A. Newman, H. F. Morrison, E. Gasperikova, and J.-I. Berg, 2001, Reservoir characterization using crosswell electromagnetic inversion: A feasibility study for HTE Snorre field, North Sea: Geophysics, 66, 1177-1189, doi: 10.1190/1.1487064.

Howard, A. Q., 1972, The electromagnetic fields of a subterranean cylindrical in homogeneity excited by a line source: Geophysics, 37, 975-984, doi: 10.1190/1.1440320.

Johnson, R. H., F. N. Trofimenkoff, and J. W. Haslett, 1987, Resistivity response of a homogeneous Earth with a finite-length contained vertical conductor: IEEE Transactions on Geoscience and Remote Sensing, GE-25, 414-421, doi: 10.1109/TGRS.1987.289852.

McGillivray, P. R., D. W. Oldenburg, R. G. Ellis, and T. M. Habashy, 1994, Calculation of sensitivities for the frequency-domain electromagnetic problem: Geophysical Journal International, 116, 1-4, doi: 10.111/j.1365-246X.1994.tb02121.x.

Mukherjee, S., and M. E. Everett, 2011, 3-D controlled source electromagnetic edge-based finite element modeling of conductive and permeable heterogeneities: Geophysics, 76, no. 4, F215-F226, doi: 10.1190/1.3571045.

Newmark, R. L., W. Daily, and A. Ramirez, 1999, Electrical resistance tomography using steel cased borehole as electrodes: 96th Annual International Meeting, SEG, Expanded Abstracts, 327-330.

Parry, J. R., and S. H. Ward, 1971, Electromagnetic scattering from cylinders of arbitrary cross section in conductive half-space: Geophysics, 36, 67-100, doi: 10.1190/1.1440165.

Patzer, C., K. Tietze, and O. Ritter, 2017, Steel-cased wells in 3-D controlled source EM modelling: Geophysical Journal International, 209, 813-826, doi: 10.1093/gji/ggx049.

Qian, W., and D. E. Boerner, 1995, Electromagnetic modeling of buried line conductors using an integral equation: Geophysical Journal International, 121, 203-214, doi: 10.111/j.1365-246X.1995.tb03521.x.

Robinson, J., T. Johnson, and L. Slater, 2013, Evaluation of known-boundary and resistivity constraints for improving cross-borehole DC electrical resistivity imaging of discrete fractures: Geophysics, 78, no. 3, D115-D127, doi: 10.1190/geo2012-0333.1.

Rucker, C., T. Günther, and K. Spitzer, 2006, Three-dimensional modelling and inversion of DC resistivity data incorporating topography (i) modelling: Geophysical Journal International, 166, 495-505, doi: 10.1111/j.1365-246X.2006.03010.x.

Schenkel, C. J., and H. F. Morrison, 1990, Effects of well casing on potential field measurements using downhole current sources: Geophysical Prospecting, 38, 663-686, doi: 10.1111/j. 1365-2478.1990.tb01868.x.

Schwarzbach, C., R.-U. Börner, and K. Spitzer, 2011, Three-dimensional adaptive higher order finite element simulation for geo-electromagnetics: A marine CSEM example: Geophysical Journal International, 187, 63-74, doi: 10.1111/j.1365-246X.2011.05127.x.

Um, E. S., M. Commer, G. A. Newman, and G. M. Hoversten, 2015, Finite element modeling of transient electromagnetic fields near steel-cased wells: Geophysical Journal International, 202, 901-913, doi: 10.1093/gji/ggv 193.

Wait, J. R., 1952, Electromagnetic fields of current-carrying wires in a conducting medium: Canadian Journal of Physics, 30, 512-523, doi: 10.1139/p52-049.

Wait, J. R., 1957, The effect of a buried conductor on the sub-surface fields for a line source excitation: Radio Science, 7, 587-591, doi: 10.1029/RS007i005p00587.

Wait, J. R., and J. T. Williams, 1985, EM and IP response of a steel well casing for a four-electrode surface array. Part I: Theory: Geophysical Prospecting, 33, 723-735, doi: 10.1111/j. 1365-2478.1985.tb00775.x.

Wang, W., X. Wu, and K. Spitzer, 2013, Three-dimensional DC anisotropic resistivity modeling using finite elements on unstructured grids: Geophysical Journal International, 193, 734-746, doi: 10.1093/gji/ggs124.

Weiss, C. J., 2001, A matrix-free approach to solving the fully 3D electromagnetic induction problem: 71st Annual International Meeting, SEG, Expanded Abstracts, 1451-1454, doi: 10.1190/1.1816377.

Weiss, C. J., D. F. Aldridge, H. A. Knox, K. A. Schramm, and L. C. Bartel, 2016, The direct-current response of electrically conductive fractures excited by a grounded current source: Geophysics, 81, no. 3, E201-E210, doi: 10.1190/GEO2015-0262.1.

Williams, J. T., and J. R. Wait, 1985, EM and IP response of a steel well casing for a four-electrode surface array. Part II: Numerical results: Geophysical Prospecting, 33, 736-745, doi: 10.1111/j.1365-2478.1985.tb00776.x.

Yang, D., D. Oldenburg, and L. Heagy, 2016, 3D DC resistivity modeling of steel casing for reservoir monitoring using equivalent resistor network: 86th Annual International Meeting, SEG, Expanded Abstracts, 932-936, doi: 10.1190/segam2016-13868475.1.

What is claimed is:

1. A computer-implemented method of preventing computationally explosive calculations arising solely in a computer as a result of the computer modeling a feature or a process in the ground, the computer-implemented method comprising:
   obtaining, by a processor of the computer, measured data of one of a physical process or a physical object;
   performing, by the processor, hierarchical numerical modeling of a physical process inclusive of an Earth model containing at least one of (a) infrastructure in the ground and (b) a formation feature in the ground, wherein predicted data is generated;
   comparing, by the processor, the measured data to the predicted data to calculate an estimated error;
   analyzing, by the processor, the estimated error via an inversion process to update the at least one of the Earth model and infrastructure model to reduce the estimated error and to determine a final composite Earth model of at least one of the infrastructure and the feature; and
   using, by the processor, the final composite Earth model to characterize at least one of the process and the physical object, wherein a characterization is created.

2. The computer-implemented method of claim 1, wherein at least the physical process is characterized, and wherein the method further comprises:
   monitoring, by the processor, the physical process over time; and
   controlling, by the processor, equipment to adjust the physical process based on changes to the final composite Earth model.

3. The computer-implemented method of claim 1, wherein the physical process includes measurement of at least one parameter selected from the group consisting of: electromagnetic fields, electro-magneto static fields, gravity fields, temperature, pressure, fluid flow, microdeformation, and a method of geophysical and environmental sensing.

4. The computer-implemented method of claim 1, wherein the physical process is selected from the group consisting of: oilfield management, oilfield exploration, and development activities selected from the group consisting of: drilling a well, stimulating a well, hydraulically fracturing a well, control of a hydraulic fracturing, intelligent well design, intelligent well completion, control of fluid injection, control of fluid production, geosteering, measurement while drilling, and wellbore telemetry, from at least one well.

5. The computer-implemented method of claim 1, wherein the inversion process is either a deterministic algorithm or a stochastic algorithm executed on the computer, and wherein the computer comprises one of specialized purpose-built computing hardware, an interface to a second computer, or purpose-built computing hardware.

6. The computer-implemented method of claim 1, wherein:
the Earth model includes one of a geologic structure and a man-made structure;
the geologic structures are selected from the group consisting of: a hydrocarbon reservoir, a mineral deposit, a water aquifer, a waste containment facility, a cap rock, a clay lens, a salt body;
the man-made structure is selected from the group consisting of: a drill string, a well casing, a well completion, a pipeline, a storage tank, an electrical cable, a wireline cable, a transportation rail line, a power line, and a fence; and
the formation feature includes a geologic structure whose physical dimension in one or more directions is small relative to surrounding geologic structures, wherein the formation feature is selected from the group consisting of a fracture, a lineation, a fault, or a thin bed.

7. The computer-implemented method of claim 6, wherein at least one of the hydrocarbon reservoir and the Earth model includes a fracture, either naturally occurring or engineered by an external process, containing an electromagnetic contrast agent, wherein the contrast agent is selected from the group consisting of: a fluid, a gas, a solid, or a combination thereof, and wherein the contrast agent further contains an engineered device, and a material or biological agent capable of active geophysical signal transmission or measurable geophysical response to physical, chemical, thermal, or radioactive stimulation.

8. The computer-implemented method of claim 1, wherein the hierarchical numerical modeling is based upon at least one of: a finite difference method, a finite volume method, a finite element method, a boundary element method, a spectral method, a spectral element method, an integral equation method, or a stochastic method.

9. The computer-implemented method of claim 1, wherein characterizing the formation feature or the infrastructure as edges and facets within a volume-based model discretization includes characterizing as an unstructured tetrahedral, hexahedral, or Voronoi mesh and using a hierarchical material properties model.

10. The computer-implemented method of claim 9, wherein using the hierarchical material properties model further comprises augmenting material property values on volumetric mesh elements by facet and edge-based material properties on regions between volumetric elements, wherein the material property values are for at least one of an electrical conductivity, an electric permittivity, and a magnetic permeability, or their reciprocals.

11. The computer-implemented method of claim 1, wherein a hierarchical finite element model includes physical material properties of at least of one Earth materials and engineered materials, wherein material property values are for at least one of an electrical conductivity, an electric permittivity, and a magnetic permeability, or their reciprocals.

12. The computer-implemented method of claim 10, wherein regions between elements are infinitesimally thin.

13. The computer-implemented method of claim 6, wherein the characterization comprises calculating a shape of the feature approximated by a set of connected edges on which a first product of cross-sectional area and material property or material property itself is explicitly defined.

14. The computer-implemented method of claim 6, wherein the characterization comprises calculating a shape of the feature approximated by a set of connected facets, that, together, warp and bend with a mesh topology and on which a product of thickness and material property or material property itself is explicitly defined.

15. The computer-implemented method of claim 13, wherein utilizing causes the feature to be represented by infinitesimally thin, arbitrarily oriented and connected facets and edges of the model, thereby eliminating a need for computationally explosive volumetric discretization of the feature or infrastructure.

16. The computer-implemented method of claim 14, wherein utilizing causes the feature to be represented by infinitesimally thin, arbitrarily oriented and connected facets and edges of the model, thereby eliminating a need for computationally explosive volumetric discretization of the feature or infrastructure.

17. The computer-implemented method of claim 1, wherein the process includes monitoring at least one of subsurface facilities and activities related to storage, disposal, or dispersal of materials selected from the group consisting of carbon dioxide, water, petrochemicals, nuclear waste, chemical waste, and hydrocarbons.

18. The computer-implemented method of claim 1, wherein the process includes monitoring at least one of subsurface facilities and activities related to military or law enforcement interests selected from the group consisting of a bunker, a silo, a tunnel, a control center, and a perimeter enforcement structure.

19. The computer-implemented method of claim 16, wherein the process includes active propagation of geophysical signals into subsurface facilities or geologic features.

20. The computer-implemented method of claim 17, wherein the process includes active propagation of geophysical signals into subsurface facilities or geologic features.

21. The computer-implemented method of claim 1, wherein the process includes exploiting infrastructure for signal propagation into physically inaccessible regions.

22. A computer comprising:
a processor; and
a non-transitory computer recordable storage medium connected to the processor, the non-transitory computer recordable storage medium storing computer code which, when executed by the processor, performs a computer-implemented method of preventing computationally explosive calculations arising solely in a computer as a result of the computer modeling a feature or a process in the ground, the computer code comprising:
computer code for obtaining, by a processor of the computer, measured data of one of a physical process or a physical object;
computer code for performing, by the processor, hierarchical numerical modeling of a physical process inclusive of an Earth model containing at least one of (a) infrastructure in the ground and (b) a formation feature in the ground, wherein predicted data is generated;
computer code for comparing, by the processor, the measured data to the predicted data to calculate an estimated error;
computer code for analyzing, by the processor, the estimated error via an inversion process to update the at least one of the Earth model and infrastructure model so as to reduce the estimated error and to determine a final composite Earth model of at least one of the infrastructure and the feature; and computer code for using, by the processor, the final composite Earth model to characterize at least one of the process and the physical object, wherein a characterization is created.

23. A non-transitory computer recordable storage medium storing computer code which, when executed by a processor, performs a computer-implemented method of preventing computationally explosive calculations arising solely in a computer as a result of the computer modeling a feature or a process in the ground, the computer code comprising:
    computer code for obtaining, by a processor of the computer, measured data of one of a physical process or a physical object;
    computer code for performing, by the processor, hierarchical numerical modeling of a physical process inclusive of an Earth model containing at least one of (a) infrastructure in the ground and (b) a formation feature in the ground, wherein predicted data is generated;
    computer code for comparing, by the processor, the measured data to the predicted data to calculate an estimated error;
    computer code for analyzing, by the processor, the estimated error via an inversion process to update the at least one of the Earth model and infrastructure model so as to reduce the estimated error and to determine a final composite Earth model of at least one of the infrastructure and the feature; and
    computer code for using, by the processor, the final composite Earth model to characterize at least one of the process and the physical object, wherein a characterization is created.

* * * * *